(12) United States Patent
Murayama et al.

(10) Patent No.: US 6,592,191 B2
(45) Date of Patent: *Jul. 15, 2003

(54) PUMP EQUIPMENT AND METHOD FOR ASSEMBLING SAME

(75) Inventors: Takashi Murayama, Kariya (JP); Takeshi Fuchida, Kariya (JP); Daizo Oba, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/034,111

(22) Filed: Jan. 3, 2002

(65) Prior Publication Data

US 2002/0053829 A1 May 9, 2002

Related U.S. Application Data

(62) Division of application No. 09/295,311, filed on Apr. 21, 1999, now Pat. No. 6,347,843.

(30) Foreign Application Priority Data

Apr. 22, 1998 (JP) .............................. 10-112436
Apr. 28, 1998 (JP) .............................. 10-119076
Jun. 23, 1998 (JP) .............................. 10-176174

(51) Int. Cl.$^7$ .................................. B60T 8/40
(52) U.S. Cl. ................... 303/116.4; 303/116.1; 417/3; 417/286; 29/888.02
(58) Field of Search ............... 303/115.1, 116.1, 303/116.3, 116.4, 10, 11; 417/3, 5, 69, 286, 287, 288, 416, 417, 428, 486; 29/888, 888.02, 888.024

(56) References Cited

U.S. PATENT DOCUMENTS 3,872,562 A * 3/1975 Pestel .......................... 29/434
4,543,789 A   10/1985 Norton .......................... 60/545
RE33,652 E * 7/1991 Yamamura et al. ......... 228/184
5,228,289 A   7/1993 Norton ..................... 303/10 X
6,142,581 A   11/2000 Yamaguchi et al. ..... 303/113.2
6,264,451 B1 * 7/2001 Murayama et al. ......... 418/171
6,270,169 B1 * 8/2001 Harada et al. ........... 303/115.1
6,347,843 B1 * 2/2002 Murayama et al. ........... 303/10

FOREIGN PATENT DOCUMENTS

| JP | 60-38186 | 3/1985 |
| JP | 61-59888 | 4/1986 |
| JP | 61-118977 | 7/1986 |
| JP | 9-126157 | 5/1997 |
| JP | 10-331777 | 12/1998 |

* cited by examiner

Primary Examiner—Pam Rodriguez
(74) Attorney, Agent, or Firm—Harness, Dickey & Pierce, PLC

(57) ABSTRACT

In a pump equipment having one or more rotary pumps for hydraulic circuit, the intake port is communicated with the shaft hole for inserting the drive shaft and fluid flows through the shaft hole to a fluid groove provided in inner surfaces of the pump room for the purpose of lubrication. To prevent fluid leakage to outside, first and second oil seals are disposed for filling the clearance between the drive shaft and the shaft hole and, preferably, a communicating conduit is provided between the first and second oil seals to transmit the fluid leaked through the first oil seal to a low pressure fluid conduit of the hydraulic circuit. In particular, in the pump equipment having plural rotary pumps, the respective discharge ports of the rotary pumps are located at the points which are nearly symmetrical with respect to the center axis of the drive shaft to counterbalance each other, the reaction forces against the drive shaft to be produced by the high pressure at the respective discharge ports.

7 Claims, 23 Drawing Sheets

PUMP EQUIPMENT AND METHOD FOR ASSEMBLING SAME

CROSS REFERENCE TO RELATED APPLICATION

This application is a divisional application of U.S. patent application Ser. No. 09/295,311 filed Apr. 21, 1999, now U.S. Pat. No. 6,347,843, the entire contents of which are hereby incorporated herein by reference thereto.

This application is based upon and claims the benefit of priority of Japanese Patent Applications No. H.10-112436 filed on Apr. 22, 1998, No. H.10-119076 filed on Apr. 28, 1998, and No. H.10-176174 filed on Jun. 23, 1998, the contents of which are incorporated herein by reference.

BACKGROUND OF THE INVENTION

1. Field of the Invention

The present invention relates to a pump equipment having one or more rotary pumps and a method for assembling the pump equipment. In particular, the present invention is preferably applied to an internal gear pump such as a trochoid pump or the like for brake apparatus for vehicles.

2. Description of Related Art

A rotary pump, for example, an internal gear pump, is comprised of a drive shaft to be driven by a motor, an inner rotor and an outer rotor to be rotated by the drive shaft and a casing for containing the drive shaft and the inner and outer rotors. The casing is provided with a pump room in which the inner and outer rotors are contained, an intake port and a discharge port for sucking and discharging oil and a shaft hole communicating to the pump room from the motor side. The drive shaft is fitted into the inner rotor through the shaft hole. In case of the internal gear pump, an oil leakage from a clearance between the casing and the drive shaft tends to be caused as its nature. To prevent the oil leakage from the clearance between the casing and the drive shaft to outside, an oil seal is provided to fill in the clearance, as described in JP-A-SHO-118977.

On the other hand, as plenty of areas at both side surfaces of the inner and outer rotors contact an inner wall of the pump room in the casing, there is a fear that the inner rotor may seizure with the inner wall of the pump room due to the lack of lubricant oil. The area of the side surfaces of the inner and outer rotors to be exposed to the intake and discharge ports is sufficiently lubricated by oil to be sucked and to be discharged. Further, the area outside in a diameter direction from the intake and discharge ports is also well lubricated due to oil running on the contacting surface by a centrifugal force to be induced, when the inner and outer rotors are rotated. However, the area inside in a diameter direction from the intake and discharge ports, in particular, at the intake port side, is not sufficiently lubricated because of no effect of the centrifugal force. Further, in the case of the rotary pump in which the drive shaft is held by one or more bearings disposed in the shaft hole of the casing, there is a possibility that the bearing seizure takes place because the relatively slender size of bearings are generally used and tend to be filled with heat.

Furthermore, as an example of the pump in which two rotary pumps are rotated by a drive shaft, a tandem pump equipment is described in JP-A-H.9-126157. In the tandem pump equipment, the discharge ports of the two rotary pumps are provided, respectively, in the same direction from the drive shaft and the intake ports, respectively, in the same direction from the drive shaft, but in the opposite direction from the respective discharge ports. Each pressure at the respective discharge ports of the two rotary pumps is reacted in the same direction against the drive shaft and the drive shaft receives an unbalanced force so that the pump operation may be adversely affected due to the bending of the shaft.

SUMMARY OF THE INVENTION

An object of the present invention is to provide rotary type pump equipment having a construction that the intake port is positively communicated, inside the oil seal of the casing, with the shaft hole for inserting the drive shaft for the purpose of lubrication. This construction is effective not only for smoothly rotating the drive shaft and the pump, but also for easily escaping air entered through the oil seal from the intake port.

More clearly, it is an aspect of the present invention to provide a rotary pump in which the seizure will not happen at the side surfaces of the inner rotor. There is provided a fluid groove extending from the intake port to the center bore in both inner surfaces of the pump room in the casing, respectively. When the rotors are rotated, fluid oil is supplied from the fluid groove to a small gap between the inner surface of the pump room and the side surfaces of the rotors. The fluid will serve, as lubricating oil, to prevent the seizure of rotors. Further, a fluid path along the drive shaft is provided on the inner surface of the center bore of the casing for communicating the fluid groove to an intake conduit which transmits fluid to the intake port of the pump room. A part of the fluid path is constituted through the portion where the bearing for holding the drive shaft is located on the surface of the shaft hole of the casing. The flow of fluid through the intake conduit, the bearing portion, the fluid path along the drive shaft, the fluid groove and the intake port of the pump room will serve to prevent the seizure of the rotors as well as the seizure of the bearing.

On the other hand, it is important to prevent the fluid leakage from the discharge port to the intake port as much as possible for improving a pump efficiency. For this purpose, the inner surface of the pump room, that is, the surfaces of cylinders constituting the pump room, is fabricated by grinding in the direction not crossing the intake port and the discharge port.

In case of applying the pump equipment mentioned above to the brake apparatus, it is preferable that the intake port of the pump is disposed at a portion of the hydraulic circuit where the fluid pressure is relatively low. To prevent the high pressure to be applied to the intake port, there is generally provided, at an intake port side of the pump in the hydraulic circuit, with a control valve for controlling the communication and interruption of the fluid conduit or a low pressure reservoir with a pressure regulating valve at its intake side. However, if high pressure is applied accidentally to the intake port due to a malfunction of the control valve or the reservoir, there is a fear that oil is leaked to the outside through the above oil seal or the oil seal is broken down, as the case may be.

Therefore, it is another aspect of the present invention to provide a rotary type pump equipment capable of preventing fluid leakage to the outside, even if high pressure is applied to the intake port. For this purpose, in addition to a first seal, a second oil seal for filling the clearance between the drive shaft and the shaft hole of the casing is disposed at an opposite side of the pump room adjacent to the first oil seal.

In particular, it is preferable to provide a communicating conduit between the first and second oil seals in order to transmit the fluid leaked from the clearance between the drive shaft and the first oil seal to a relatively low pressure fluid conduit of the hydraulic circuit.

A further aspect of this invention is to provide pump equipment having one or more rotary pumps, in which the drive shaft of the pump is coupled with a motor shaft of the motor inside a motor bearing so as to rotate smoothly the drive shaft, even if the center axes of the motor shaft and the drive shaft are offset. The back up plate for the oil seal of the pump side is commonly used for fixing the motor shaft bearing. Therefore, the number of the components constituting the pump equipment is so far reduced.

Furthermore, it is possible to provide a fluid communicating path between the oil seal of the pump side and the motor bearing. For this purpose, the back up plate is provided with a fluid path such as a groove for guiding fluid leaked through the oil seal of the drive shaft to the low pressure conduit so that the fluid may be prevented from going into the motor.

A further object of the present invention is to provide pump equipment having two rotary pumps to be rotated by a drive shaft in which fluid leakage through the shaft hole of the casing, for example, between the two pumps or between the pump and the motor, may be reliably prevented. A sealing member constituted by a ring shaped resin element and an elastic ring element fitted into the groove of the resin element is installed in the shaft hole of the casing. As the elastic ring element is positioned in the groove of the resin element, the accurate position of the elastic ring element may be always secured so as to ensure oil sealing effect and, if applied between the two pumps, the elastic ring element will not be worn by the friction with the pump rotor.

A further aspect of the present invention is to provide a pump equipment having a plurality of rotary pumps capable of smoothly rotating the pumps because of a limited bending of their drive shafts. The pump equipment has a construction that the respective discharge ports of the rotary pumps are located at the points which are nearly symmetrical with respect to the center axis of the drive shaft. The respective reaction forces against the drive shaft to be produced by the high pressure at the respective discharge ports may counterbalance each other so that the possible bending of the drive shaft may be limited. As another aspect of the present invention for limiting the bending of the drive shaft for the pump equipment having two rotary pumps, the intake and discharge fluid conduits of one pump and the intake and discharge fluid conduits of the other pump are arranged at the locations which are not between the pumps, but outside from the pumps, respectively. Preferably, the respective discharge fluid conduits of the two pumps are located at the points which are opposite each other, more preferably, different at an angle of 180 degrees each other, with respect to the center axis of the drive shaft. These locations of the intake and discharge fluid conduits will serve to narrow the space between the two pumps so that the pump equipment may become compact.

As a further aspect of the present invention, two bearings for holding the drive shaft are arranged outside the two pumps, that is, at the respective positions between which the two pumps are inserted. The forces due to the high pressure at the discharge ports are reacted against the drive shaft inside the two bearings. Therefore, the bending of the drive shaft is more limited, compared with a case that the forces are reacted against the drive shaft outside the two bearings.

Furthermore, it is one of the objects to provide a method for assembling the pump equipment in such a way that a part of the peripheral border between respective cylindrical members piled up for constituting the casing is tentatively welded by laser beam at first and, then, all around the peripheral borders are finally welded. Such a method is effective for limiting a deformation or a position shift of the respective members, because the energy of the tentative spot welding by laser beam is less than that of the final welding and, therefore, the deformation force by laser beam is not so strongly influenced.

It is preferable to apply to the welding portions the laser beams from plural side positions at the same time so as to counterbalance each other the respective forces given by laser beams to the welding portions. This method may be used in the above tentative spot welding. Furthermore, such a method makes it possible to weld all around the peripheral borders without causing the deformation or the position shift of the respective cylindrical members, even if the tentative spot welding is eliminated and the relatively large energy of laser beams is applied at the same time to the welding portions.

It is a final object of the present invention to provide a brake apparatus having a hydraulic circuit in which the pump equipment described above is applied. The pump equipment is used for increasing fluid pressure to wheel cylinders in the hydraulic circuit. In particular, each plural rotary pump is operative in each of the fluid conduits separately provided in the hydraulic circuit.

BRIEF DESCRIPTION OF THE DRAWING

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF THE PREFERRED EMBODIMENTS

Figure 1:
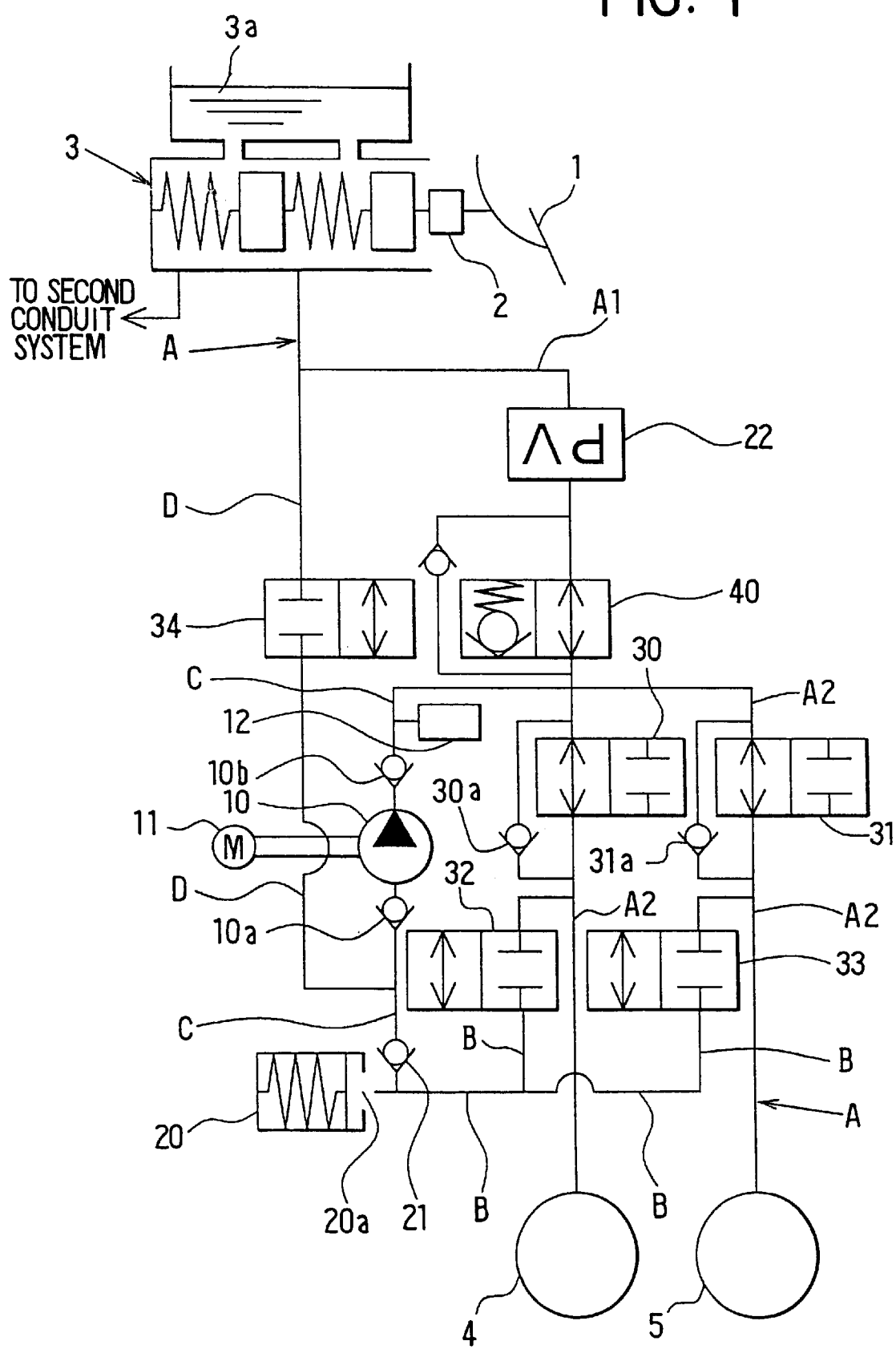
FIG. 1 is an outline structure of a brake apparatus.

FIG. 1 shows an outline structure of a brake apparatus to which a trochoid pump is applied as a rotary pump. The basic constitution of the brake apparatus will be described with reference to FIG. 1. In this embodiment, a brake apparatus is applied to a vehicle provided with a hydraulic circuit of a diagonal conduit system having a first conduit connecting wheel cylinders of a front right wheel and a rear left wheel and a second conduit connecting wheel cylinders of a front left wheel and a rear right wheel. The vehicle is a four wheel vehicle of front wheel drive.

As shown in FIG. 1, a brake pedal 1 is connected to a booster 2. Brake depression force (brake pedal stroke) is boosted by the booster 2.

Further, the booster 2 is provided with a rod for transmitting boosted depression force to a master cylinder 3. In detail, the master cylinder 3 generates master cylinder pressure when the rod pushes a master piston arranged in the master cylinder 3. The brake pedal 1, the booster 2 and the master cylinder 3 correspond to a brake fluid pressure generating device.

The master cylinder 3 is provided with a master reservoir 3a for supplying brake fluid into the master cylinder 3 or storing extra brake fluid of the master cylinder 3.

Further, the master cylinder pressure is transmitted to a wheel cylinder 4 for a front right wheel (FR) and a wheel cylinder 5 for a rear left wheel (RL) via a brake assist system provided with a function of an antilock brake system (hereinafter, referred to as ABS). In the following explanation, the brake apparatus will be described with respect to the hydraulic circuit in the first conduit connecting the wheel cylinders of a front right wheel (FR) and a rear left wheel (RL). The explanation for the second conduit connecting the wheel cylinders of a front left wheel (FL) and a rear right wheel (RR) will be omitted since the hydraulic circuit in the second conduit is quite similar to that in the first conduit.

The brake apparatus is provided with a conduit A (main conduit) connected to the master cylinder 3. A proportioning valve (PV) 22 is disposed in the main conduit A. The main conduit A is divided into two portions by the proportioning valve 22. That is, the main conduit A is divided into a first conduit A1 from the master cylinder 3 to the proportioning valve 22 and a second conduit A2 from the proportioning valve 22 to the respective wheel cylinders 4 and 5.

The proportioning valve 22 has a function of transmitting a reference pressure of a brake fluid to the downstream side with a predetermined attenuation rate when the braking fluid flows in the positive direction (in this embodiment, a direction from the side of the wheel cylinder to the side of the master cylinder is the positive direction). That is, by inversely connecting the proportioning valve 22 as shown in FIG. 1, pressure of the brake fluid on the side of the second conduit A2 becomes the reference pressure.

Further, the second conduit A2 branches out two conduits. A pressure increasing control valve 30 for controlling an increase of brake fluid pressure of the wheel cylinder 4 is installed to one of the branched conduits and a pressure increasing control valve 31 for controlling an increase of brake fluid pressure of the wheel cylinder 5 is installed to the other thereof.

The pressure increasing control valves 30 and 31 are two-position valves capable of controlling communicating and shut-off states by an electronic control unit (hereinafter, referred to as ECU). When the two-position valves are controlled to a communicating state, the master cylinder pressure or the brake fluid pressure produced by a pump 10 can be applied to the respective wheel cylinders 4 and 5.

In the normal braking operation where ABS is not controlled by the ECU as in the case where pressure reduction of the wheel cylinder pressure is not carried out, the pressure increasing control valves 30 and 31 are always controlled in the communicating state. Safety valves 30a and 31a are installed in parallel with the pressure increasing control valves 30 and 31, respectively. The safety valves 30a and 31a allow the brake fluid to swiftly return from the wheel cylinders 4 and 5 to the master cylinder 3 when ABS control has been finished by stopping depression of the brake pedal 1.

Pressure reducing control valves 32 and 33 capable of controlling communicating and shut-off states by the ECU are respectively arranged at conduits B connecting the second conduits A2 between the pressure increasing control valves 30 and 31 and the wheel cylinders 4 and 5, and a reservoir port 20a of a reservoir 20. In the normal braking operation, the pressure reducing control valves 32 and 33 are always brought into a cut-off state.

A rotary pump 10 is arranged at a conduit C connecting the reservoir hole 20a of the reservoir 20 and the second conduit A2 between the proportioning valve 22 and the pressure increasing control valves 30 and 31. Safety valves 10a and 10b are disposed in the conduit C on both sides of the rotary pump 10. The safety valves 10a and 10b may be built in the rotary pump 10. A motor 11 is connected to the rotary pump 10 to drive the rotary pump 10. A detailed explanation of the rotary pump 10 will be given later.

A damper 12 is arranged on the discharge side of the rotary pump 10 in the conduit C to alleviate pulsation of the brake fluid delivered by the rotary pump 10. An auxiliary conduit D is installed to connect the conduit C between the reservoir 20 and the rotary pump 10, and the master cylinder 3. The rotary pump 10 sucks the brake fluid of the first conduit A1 via the auxiliary conduit D and discharges it to the second conduit A2, whereby the brake fluid pressures of the wheel cylinders 4 and 5 are made higher than the master cylinder pressure. As a result, wheel braking forces of the wheel cylinders 4 and 5 are increased. The proportioning valve 22 works to hold the pressure difference between the master cylinder pressure and the wheel cylinder pressure.

A control valve 34 is installed in the auxiliary conduit D. The control valve 34 is always brought into a cut-off state in the normal braking operation.

A check valve 21 is arranged between a connection point of the conduit C and the auxiliary conduit D and the reservoir 20 to prevent the brake fluid drawn via the auxiliary conduit D from flowing in a reverse direction to the reservoir 20.

A control valve 40 is disposed between the proportioning valve 22 and the pressure increasing control valves 30 and 31 in the second conduit A2. The control valve 40 is normally controlled in a communicating state. However, the control valve 40 is switched to a differential pressure producing state to hold the pressure difference between the master cylinder pressure and the wheel cylinder pressure, in a case that the vehicle is rapidly braked, when the master cylinder pressure is too low to obtain the necessary wheel cylinder pressure by some reasons, for example, in a case where the boosting function of the booster 2 is lowered or lost and, at this time, the pump 10 is operated. Also, the control valve 40 is switched to the differential pressure producing state when traction control (TRC) is carried out. Though the control valve 40 and the proportioning valve 22 are employed in this embodiment, it is possible to have only a pressure difference control valve for holding the pressure difference between the master cylinder and the wheel cylinder.

The structure of the pump equipment 100 will be described with reference to FIGS. 2 and 3. A motor 11 for driving rotary pumps 10 and 13 is fixed on an opening side of a cylinder block 4 for brake apparatus. The cylinder block 4 is provided with a cylindrical bore 7 in which a casing 50 is equipped under sealing of o rings 15a, 15b and 15c. The casing 50 has a shaft hole 8 into which a drive shaft 54 is inserted. The rotary pumps 10 and 13 are respectively rotated by the drive shaft 54 in the casing 50. As mentioned above, the brake apparatus is provided with the hydraulic circuit having first and second conduit lines. An intake conduit 19 and a discharge conduit 21 of the first conduit line are respectively communicating with the first rotary pump 10 and an intake conduit 23 and a discharge conduit 25 of the second conduit line with the second rotary pump 13. The o rings 15a, 15b and 15c serve to seal the fluid communication between the intake and discharge conduits 19 and 21, between the discharge conduits 21 and 25 and between the discharge and intake conduits 25 and 23, respectively.

Figure 3:
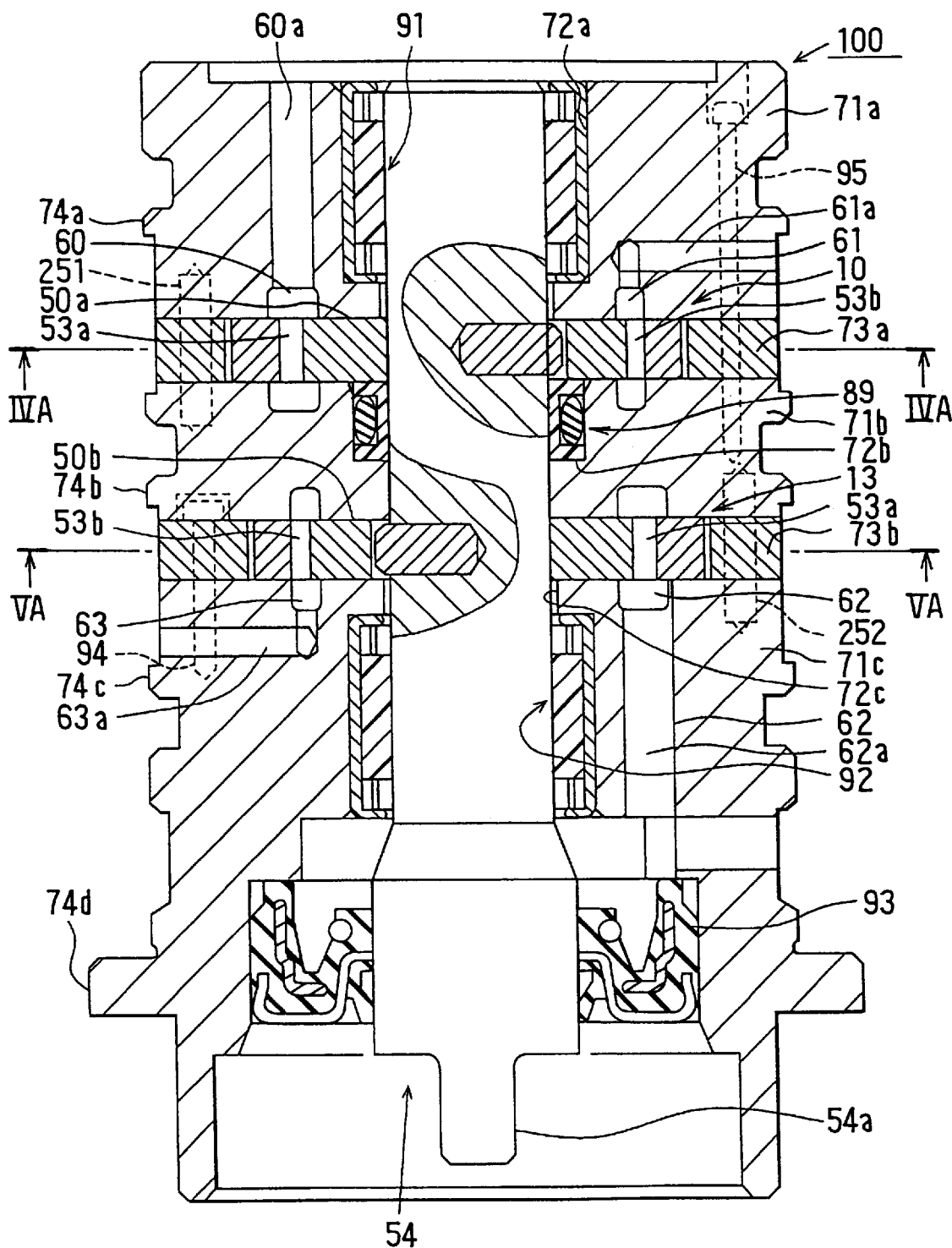
FIG. 3 is an enlarged sectional view of a casing.

As described in FIG. 3, the casing 50 is constituted by first, second and third cylinders 71a, 71b and 71c and first and second cylindrical center plates 73a and 73b. After piling up in order the first cylinder 71a, the first cylindrical center plate 73a, the second cylinder 71b, the second cylindrical center plate 73b and the third cylinder 71c, the casing 50 of the pump equipment 100 is assembled by welding all of peripheral borders of the piled up cylinders 71a, 71b and 71c and cylindrical center plates 73a and 73b. A pump room 50a of the first rotary pump 10 is constructed by putting the first cylindrical center plate 73a, as an end wall of the pump room 50a, between the first and second cylinders 71a, and 71b, as both side walls of the pump room 50a. On the other hand, a pump room 50b of the second rotary pump 13 is constructed by putting the second cylindrical center plate 73b between the second and third cylinders 71b and 71c.

The first, second and third cylinders are respectively provided with first, second and third center bores 72a, 72b and 72c to constitute the shaft hole 8. A roll type first bearing 91 is disposed at the internal periphery of the first center bore 72a and a roll type second bearing 92 at the internal periphery of the third center bore 72c. The drive shaft 54 inserted through the first, second and third center bores 72a, 72b and 72c is held between the first and second bearings 91 and 92. Consequently, the two rotary pumps 10 and 13 may be put between the bearings 91 and 92.

The third cylinder 71c has a recess at a side opposite to the surface where the second cylindrical center plate is welded. The drive shaft 54 has a key 54a which is formed by being partly projected from its end portion 1 and protruded into the recess of the third cylinder 71c. The key 54a is used to couple the drive shaft 54 with a motor shaft of the motor 11. An oil seal 93 is disposed in the recess of the third cylinder 71c in such a way that the outside surface of the drive shaft may be wrapped up.

The outside surfaces of the first, second and third cylinders 71a, 71b and 71c are provided respectively with flange portions 74a, 74b and 74c, each of which is protruded further from the portions where the first, second and third cylinders 71a, 71b and 71c and the first and second cylindrical center plates 73a and 73b are welded. The flange portions 74a, 74b and 74c are so constructed that the respective outer diameter of the welded portions, even if expanded by welding, may not go beyond the respective outer diameter of the flange portions 74a, 74b and 74c. As the expanded outer diameter of the welded portions never exceeds the outer diameter of the o rings 15a, 15b and 15c as the flange portions 74a, 74b and 74c are formed, the pump 100 may be effectively assembled to the cylinder block 4. Further, the outer surface of the third cylinder is provided with a flange 74d, the outer diameter of which is larger than that of the flange portion 74c. The flange 74d is used not only as a portion where the pump equipment is fixed by caulking in the cylinder block 4 but also as a position setting reference for assembling and welding the casing 50 of the pump equipment 100, as described later. Screws 94 and 95 are for the temporal fitting before the welding, as explained in detail later.

Figure 4A:
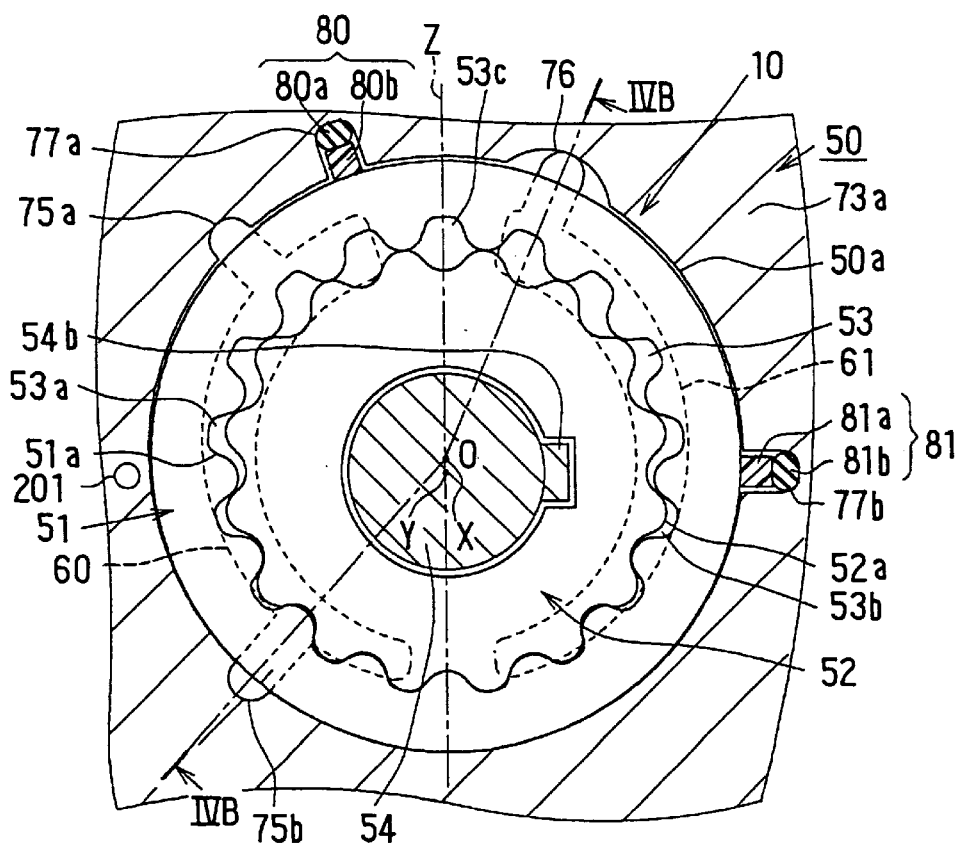
FIG. 4A is a sectional view taken along a line IVA—IVA of FIG. 3.
Figure 4B:
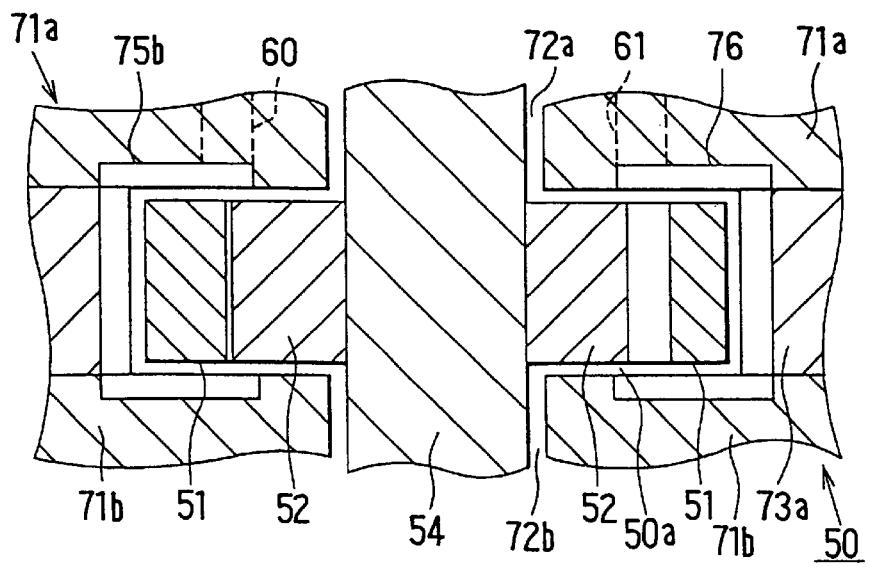
FIG. 4B is a sectional view taken along a line IVB—IVB of FIG. 4A.
Figure 5A:
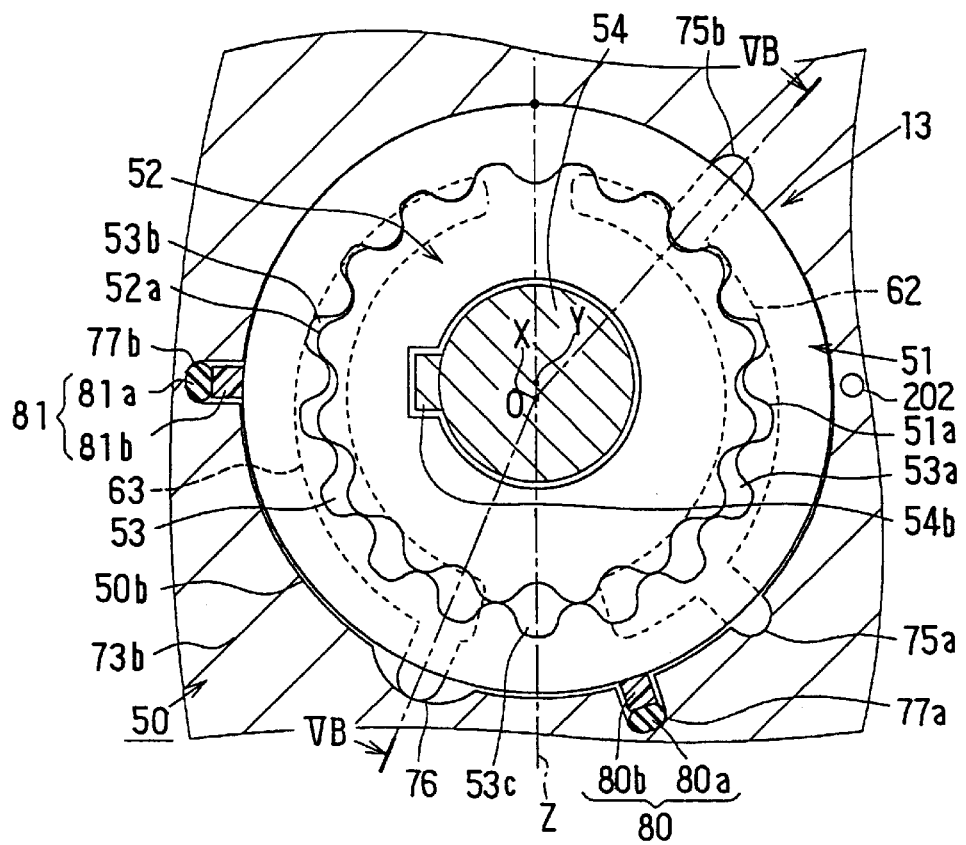
FIG. 5A is a sectional view taken along a line VA—VA of FIG. 3.
Figure 5B:
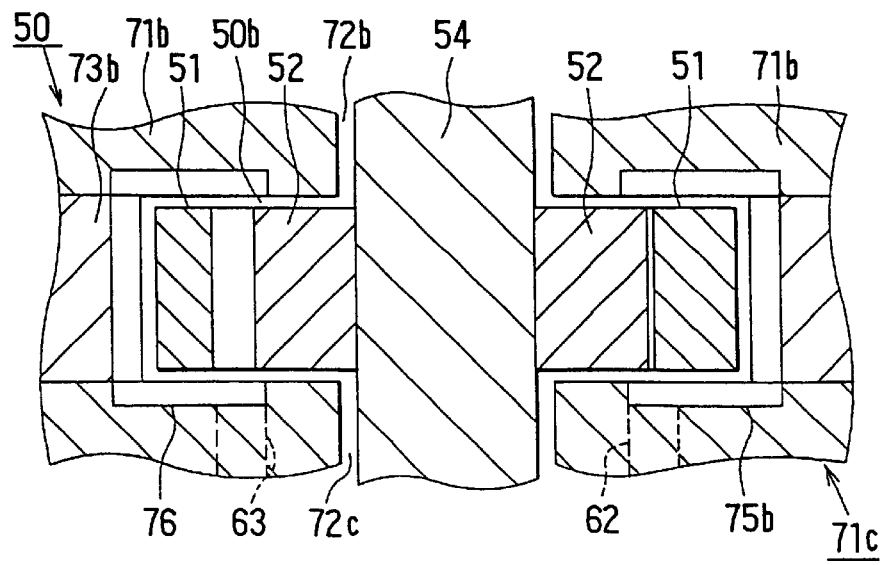
FIG. 5B is a sectional view taken along a line VB—VB of FIG. 5A.

FIG. 4A is a sectional view taken along a line IVA—IVA of FIG. 3 and FIG. 4B is a sectional view taken along a line IVB—IVB of FIG. 4A. FIG. 5A is a sectional view taken along a line VA—VA of FIG. 3 and FIG. 5B is a sectional view taken along a line VB—VB of FIG. 5A. First, the structure of the rotary pump 10 will be described with reference to FIGS. 4A and 4B.

An outer rotor 51 and an inner rotor 52 are contained in the pump room 50a of the casing 50. The outer rotor 51 and the inner rotor 52 are assembled in the casing 50 in a state where respective central axes (point X and point Y in the drawing) are shifted from each other. The outer rotor 51 is provided with an inner teeth portion 51a at its inner periphery. The inner rotor 52 is provided with an outer teeth portion 52a at its outer periphery. The inner teeth portion 51a of the outer rotor 51 and the outer teeth portion 52a of the inner rotor 52 form a plurality of gap portions 53 and are in mesh with each other. As is apparent from FIG. 4A, the rotary pump 10 is a pump of a multiple teeth trochoid type having no partition plate (crescent) in which the gap portions 53 are formed by the inner teeth portion 51a of the outer rotor 51 and the outer teeth portion 52a of the inner rotor 52. The inner rotor 52 and the outer rotor 51 share a plurality of contact points (that is, contact faces) at the mesh faces in order to transmit rotation torque of the inner rotor 52 to the outer rotor 51.

The drive shaft 54 for driving the inner rotor 52 is provided with a key 54b, whereby drive force is transmitted from the drive shaft 54 to the inner rotor 52 via the key 54a. The outer rotor 51 and the inner rotor 52 are rotatably arranged in the center bore of the cylindrical center plate 73a. That is, a rotating unit constituted by the outer rotor 51 and the inner rotor 52 is rotatably incorporated in the pump room 50a of the casing 50. The outer rotor 51 rotates with point X as a rotation axis and the inner rotor 52 rotates with point Y as a rotation axis.

A hole 201 is provided for inserting a pin 251 described in the FIG. 3 for the position setting at the welding operation as explained later. In the first and second cylinders 71a, and 71b, recesses are also provided at the position corresponding to the hole 201 for inserting the pin 251, respectively.

When a line running on both point X and point Y respectively corresponding to the rotation axes of the outer rotor 51 and the inner rotor 52 is defined as a center line Z of the rotary pump 10, an intake port 60 and a discharge port 61 both of which communicate with the pump room 50a are formed on the left and right sides of the center line Z in the first cylinder 71a. There are also provided with an intake conduit 60a extending from the intake port 60 to the intake conduit 19 and a discharge conduit 61a extending from the discharge port 61 to the discharge conduit 21, as described in FIGS. 2 and 3. The intake port 60 and the discharge port 61 are arranged at positions communicating with a plurality of gap portions 53 constituted by intake chambers 53a and discharge chambers 53b. The brake fluid from outside can be sucked into the intake chambers 53a via the intake port 60 and the brake fluid in the discharge chambers 53b can be discharged to outside via the discharge port 61.

The first cylinder 71a is provided with communicating paths 75a and 75b for communicating the outer periphery of the outer rotor 51 with the intake port 60 and a communicating path 76 for communicating the outer periphery of the outer rotor 51 with the discharge port 61. The communicating paths 75a and 75b are arranged at positions advanced respectively in left and right directions from the center line Z to the intake port 60 by an angle of about 45 centering on point X constituting the rotation axis of the outer rotor 51. The communicating path 76 is formed to communicate the gap portion 53 most adjacent to the first closed gap portion 53c in the plurality of gap portions 53 communicating with the discharge chamber 53b with the outer periphery of the outer rotor 51. Specifically, the communicating path 76 is arranged at a position advanced in right direction from the center line Z to the discharge port 61 by an angle of about 22.5 centering on point X.

Recessed portions 77a and 77b are formed on a wall face of the first cylindrical center plate 73a forming the pump room 50a at a position advanced in the left direction from the center line Z to the intake chamber 53a by an angle of about 22.5 degrees and at a position advanced in right direction from the center line Z to the discharge chamber 53b by an angle of about 90 degrees centering on point X constituting the rotation axis of the outer rotor 51. Seal members 80 and 81 are respectively installed in the recessed portions 77a and 77b to restrain the brake fluid from flowing in the outer periphery of the outer rotor 51. Specifically, the seal members 80 and 81 are arranged respectively at an intermediate point between the communicating paths 75a and 76 and the communicating paths 76 and 75b. The seal members 80 and 81 serve to separate, in the clearance between the outer rotor 51 and the cylindrical center plate 73a, a portion in which pressure of the brake fluid is low from a portion in which pressure of the brake fluid is high.

The seal members 80 and 81 are constituted by rubber members 80a and 81a substantially in a shape of a circular cylinder and resin members 80b and 81b made of Teflon in a shape of a cube. The resin members 80b and 81b are biased by the rubber members 80a and 81a to be brought into contact with the outer rotor 51. That is, more or less error amount is caused in the size of the outer rotor 51 by fabrication error or the like. Accordingly, the error amount can be absorbed by the rubber members 80a and 81a having elastic force.

The rotary pump 10 has the construction as described above and, hereafter, the rotary pump 13 will be explained according to FIGS. 5A and 5B. As the construction of the rotary pump 13 is nearly the same as that of the rotary pump 10, only the different portions thereof will be described and the explanation of the portions having the same reference number as that of the rotary pump 10 will be omitted.

The outer and inner rotors of the rotary pump 13 is contained in a pump room 50b constituted by the second cylindrical center plate 73b, as an end wall of the pump room, and the second and third cylinders 71b and 71c, as both side walls of the pump. Respective parts and components of the rotary pump 13 are arranged at the positions where the respective parts and components of rotary pump 10 shown in the FIGS. 4A and 4B are rotated by an angle of 180 with respect to the center axis of the drive shaft 54. The third cylinder 71c is provided with intake and discharge conduits 62a and 63a extending respectively from intake and discharge ports 62 and 63 to the intake and discharge conduits 23 and 25 of the cylinder block 4. The positions of the intake and discharge conduits 60a and 61a in the first cylinder 71a and the positions of the intake and discharge conduits 62a and 63a in the third cylinder 71c are opposite each other, in another word, nearly symmetrical, with respect to the center axis of the drive shaft 54, as illustrated in FIGS. 2 and 3.

A hole 202 shown in FIG. 5A is for inserting a pin 252 described in FIG. 3 for the position setting at the welding operation as explained later. In the second and third cylinders 71b and 71c, recesses are also provided at the position corresponding to the hole 202 for inserting the pin 252, respectively.

The rotary pumps 10 and 13 constituting the pump equipment 100 are constructed as described above.

Next, an explanation will be given of operation of the brake apparatus and the pump equipment 100 with reference to the rotary pump 10. The control valve 34 provided in the brake apparatus is pertinently brought into a communicating state when high pressure brake fluid needs to be supplied to the wheel cylinders 4 and 5, for example, when braking force in correspondence with depressing force of the brake pedal 1 cannot be obtained because of failure of the booster 2, or when an amount of operating the braking pedal 1 is large. When the control valve 34 is switched in the communication state, the master cylinder pressure generated by depressing the brake pedal 1 is applied to the rotary pump 10 via the auxiliary conduit D.

In the rotary pump 10, the inner rotor 52 is rotated in accordance with rotation of the drive shaft 54 by driving the motor 11. In response to rotation of the inner rotor 52, the outer rotor 51 is also rotated in the same direction by the mesh between the inner teeth portion 51a and the outer teeth portion 52a. At this time, the volume of each of the gap portions 53 is changed from large to small or vice versa during a time period in which the outer rotor 51 and the inner rotor 52 make one turn. Therefore, the brake fluid is sucked from the intake port 60 to the intake chambers 53a and is discharged from the discharge port 61 through the discharge chambers 53b to the second conduit A2. Pressures of the wheel cylinders can be increased using the discharged brake fluid.

In this way, the rotary pump 10 can carry out a basic pumping operation in which the brake fluid is sucked from the intake port 60 and is discharged from the discharge port 61 by rotation of the rotors 51 and 52.

According to the embodiment mentioned above, the communicating paths 75a, 75b and 76 serve to operate in such a way that the respective fluid pressure of the outer periphery of the outer rotor 51 at the intake and discharge sides are kept separate as the respective low and high fluid pressure of the intake and discharge ports 60 and 61. By the pressure relationship as described above, the outer rotor 51 is brought into a substantially balanced state in pressure in respect of the lateral direction of the drawing. Therefore, the rotary pump 10 may be driven stably and with good balance.

As the pressure difference exists between the low pressure portion communicating to the intake port 60 and the high pressure portion communicating to the discharge port 61 at the outer periphery of the outer rotor 51, the brake fluid may leak from the high pressure portion to the low pressure portion via the clearance between the outer periphery of the outer rotor 51. However, the brake-fluid leakage is prevented by the seal members 80 and 81 formed between the communicating paths 75a and 76 and the communicating paths 76 and 75b.

On the other hand, the rotary pump 13 is operated to suck brake fluid from the intake port 62 and discharge them from the discharge port 63, which is the same pump operation as the rotary pump 10. At this moment, as each of discharge brake fluid pressure at the sides of the discharge ports 61 and 63 becomes higher than each of intake brake fluid pressure at the sides of the intake ports 60 and 62, each of the reaction forces produced thereby is given against the drive shaft 54. However, the respective reaction forces are canceled out and counterbalance each other because the rotary pumps 10 and 13 are respectively arranged at locations different by an angle of 180 degrees and the intake ports 60 and 62 and the discharge ports 61 and 63 thereof are located at the points which are nearly symmetrical with respect to the center axis of the drive shaft 54. Therefore, the possible bending of the drive shaft 54 can be limited to assure the smooth operation of the pumps.

The intake fluid conduits 60a and 62a and the discharge fluid conduits 61a and 63a are respectively arranged at the locations which are not between the rotary pumps 10 and 13, but outside. As a result, the locations of the pumps may come closer and the distance between the first and second bearings 91 and 92 can be shorter so that the pump equipment may become compact and the possible bending of the drive shaft 54 may be more limited.

It is possible, as an alternative embodiment of the present invention, to arrange the intake fluid conduits 60a and 62a and the discharge fluid conduits 61a and 63a at the locations between the rotary pumps 10 and 13. In this case, if the intake ports 60 and 62 and the discharge ports 61 and 63 thereof are located at the points which are nearly symmetrical with respect to the center axis of the drive shaft 54, the possible bending of the drive shaft 54 can be limited to assure the smooth operation of the pumps.

Further, it goes without saying that, even in a case of employing more than two rotary pumps, the same effect mentioned above may be expected, if the respective rotary pumps are so arranged as to cancel out and counterbalance each of the respective reaction forces against the drive shaft 54 produced by the discharge high pressure of the respective rotary pumps.

Figure 6A:
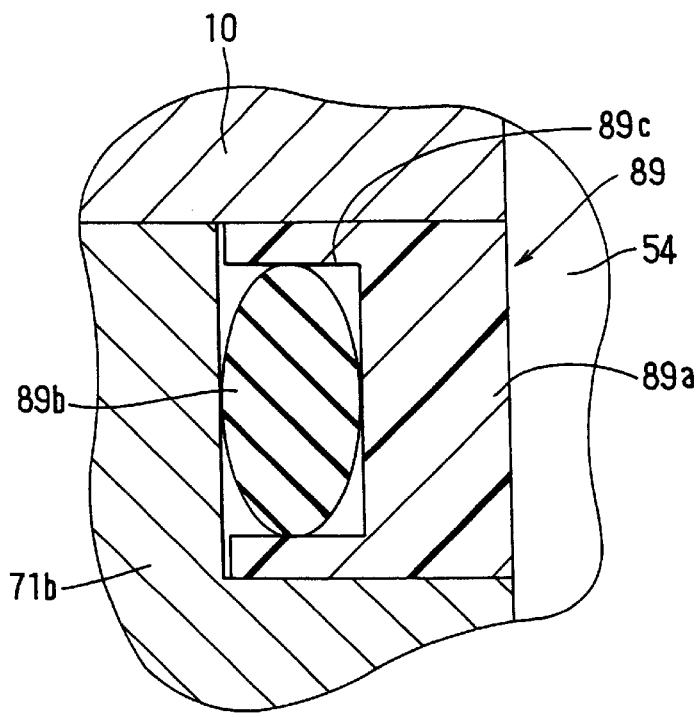
FIG. 6A is a sectional view of an oil seal.
Figure 6B:
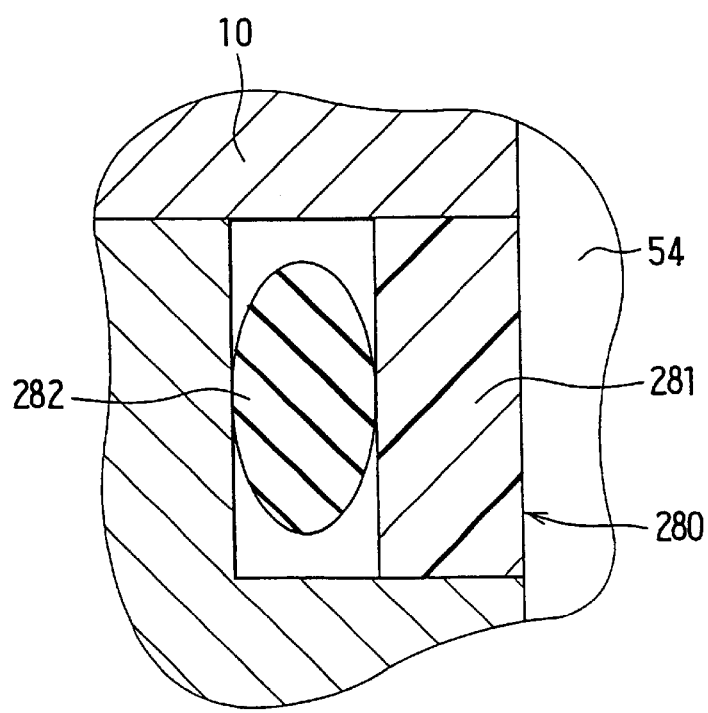
FIG. 6B is a sectional view of a conventional oil seal.

As described in FIG. 3 and in more detail in FIG. 6A, a sealing member 89 is disposed in the inner surface of the center bore 72b of the second cylinder 71b for sealing the fluid communication between the rotary pumps 10 and 13. The sealing member 89 is comprised of a ring shaped resin element 89a having a groove 89c at its outer periphery and an elastic element 89b such as rubber fitted into the groove 89c. The resin element 89a is pressed towards the drive shaft 54 by a biasing force of the elastic element 89b. According to a conventional sealing member 280 described in FIG. 6B as a prior art, a ring shaped resin element 281 does not have the groove at its outer periphery and, therefore, as the position of an o ring 282 is not stable on the outer surface of the resin element 281, the o ring tends to brake down because of contacting with the rotary pump 10. However, according to the present embodiment, only the resin element 89a may contact the rotary pump 10 and the elastic element 89b guided by the groove 89c never contacts the rotary pump 10. Therefore, while the elastic element 89b will not be worn out by the friction with the rotary pump 10, the accurate position of the elastic element 89b within the groove 89c is always secured so as to ensure the oil sealing effect.

Figure 7:
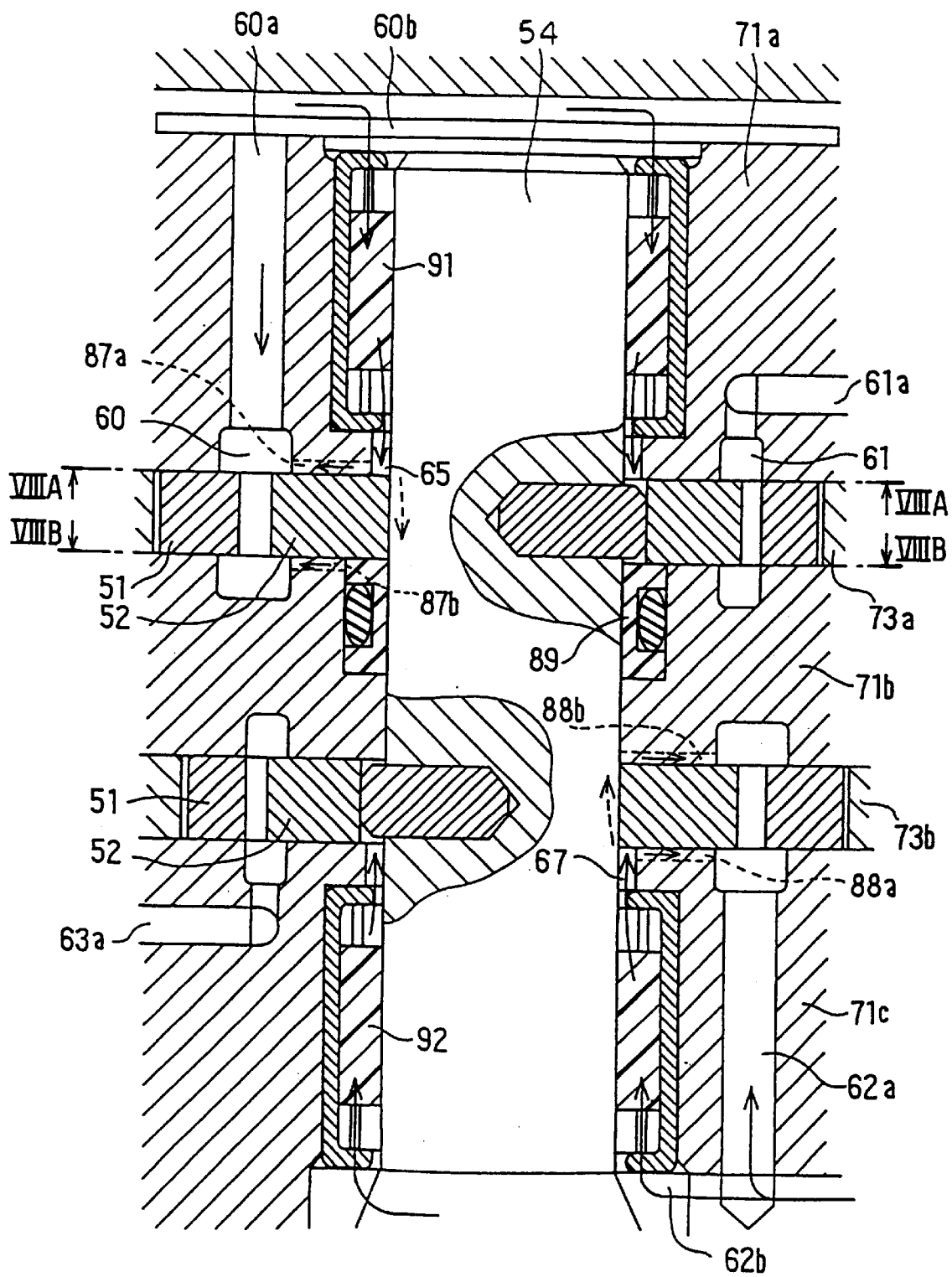
FIG. 7 is an enlarged sectional view of a part of the casing.
Figure 8A:
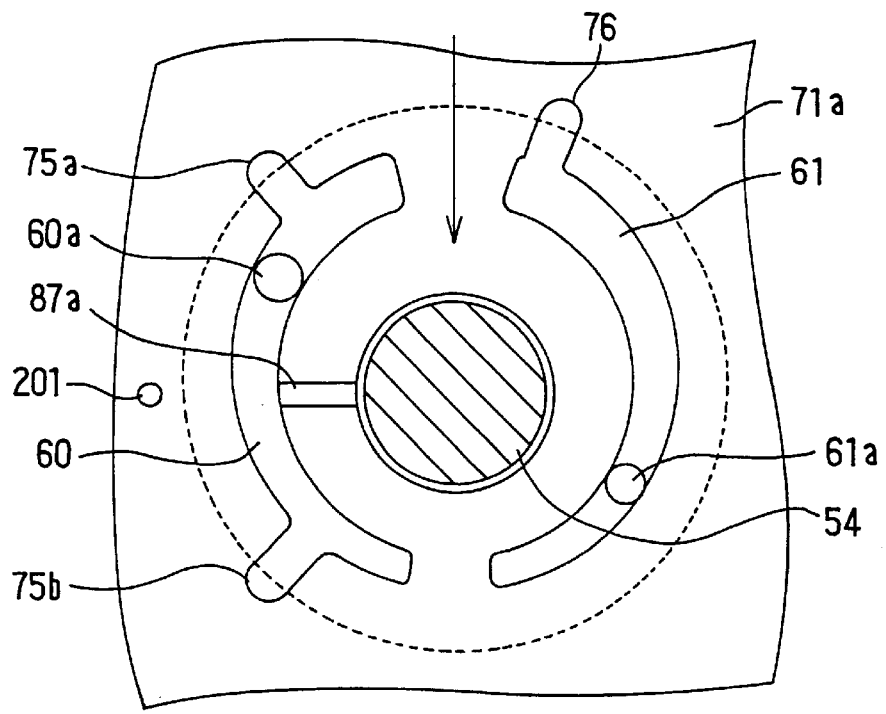
FIG. 8A is a sectional view taken along a line VIIIA—VIIIA of FIG. 7.
Figure 8B:
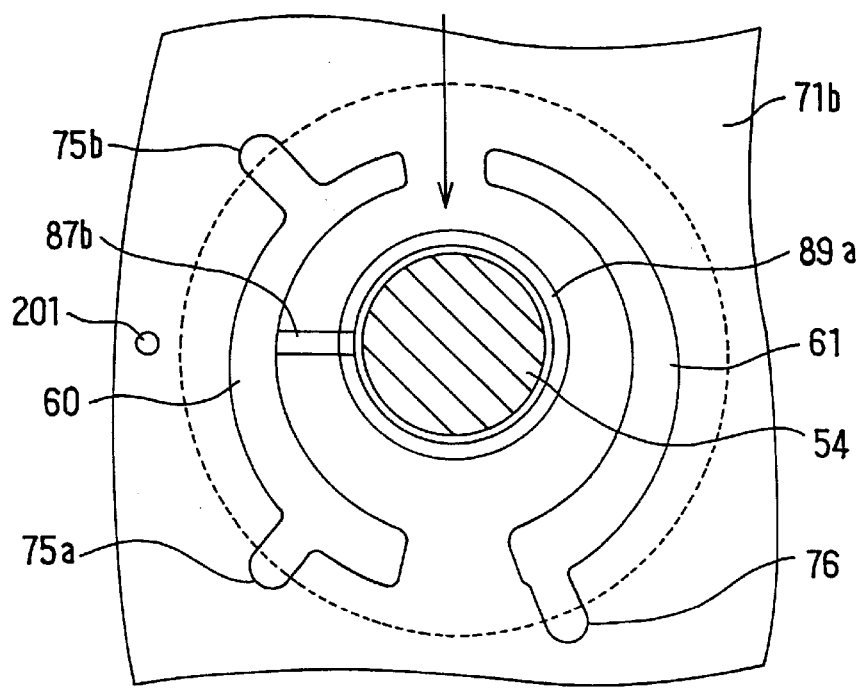
FIG. 8B is a sectional view taken along a line VIIIB—VIIIB of FIG. 7.

FIG. 7 is an enlarged sectional view with respect to a part of the casing. FIGS. 8A and 8B are sectional views taken respectively along a line VIIIA—VIIIA and a line VIIIB-–VIIIV. A more detailed construction, function and effects of the rotary pumps 10 and 13 for securing reliable pump operation will be explained with reference to FIGS. 7, 8A and 8B. Respective dotted circular lines in FIGS. 8A and 8B show portions constituting inner end walls of the pump room 50a in the respective first and second cylinders 71a, and 71b. The first and second cylinders 71a, and 71b are provided with fluid grooves 87a and 87b extending respectively from the center bores 72a and 72b to the crescent shaped intake port 60 of the rotary pump 10. Each depth of the fluid grooves 87a and 87b is thinner than that of the intake port 60, as described in FIG. 7.

Further, the diameter of the inner surface of the center bore 72a between the first bearing 91 and the pump room 50a of the rotary pump 10 is larger than that of the drive shaft 54 so that a fluid path 65 may be constituted by the clearance between the drive shaft 45 and the center bore 72a. An intake conduit 60b branched out from the intake conduit 60a is provided in the first cylinder 71a to communicate the center bore 72a to the intake conduit 19 of the cylinder block 4, as shown in FIG. 2. The brake fluid flows to the intake port 60 not only through the intake port 60a but also through the intake conduit 60b, the first bearing 91, the fluid path 65 and the fluid grooves 87a and 87b, as is indicated in FIG. 6. The fluid may be flown to the fluid groove 87b through a clearance between the drive shaft 54 and the inner rotor 52.

When the inner and outer rotors 52 and 51 rotate in the pump room 50a, the fluid leaks from the fluid grooves 87a and 87b to respective small gaps between the inner walls of the pump room 50a and both side surfaces of the inner rotor 52 at the inside of the intake port 60. Therefore, the side surfaces of the inner rotor 52 are well lubricated so that the seizure of the inner rotor 52 with the inner side walls of the pump room 50a may be prevented. Further, the seizure of the roller type first bearing 91 can be prevented because the fluid flowing through the first bearing 91 plays a role as lubricant.

Figure 8C:
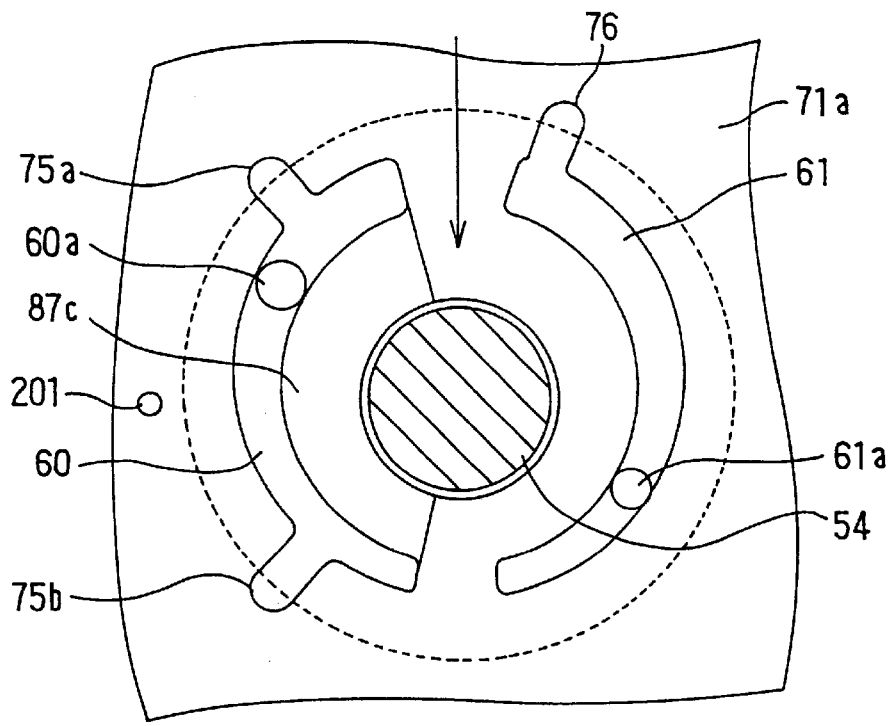
FIG. 8C is a sectional view showing another variation of FIG. 8A.
Figure 8D:
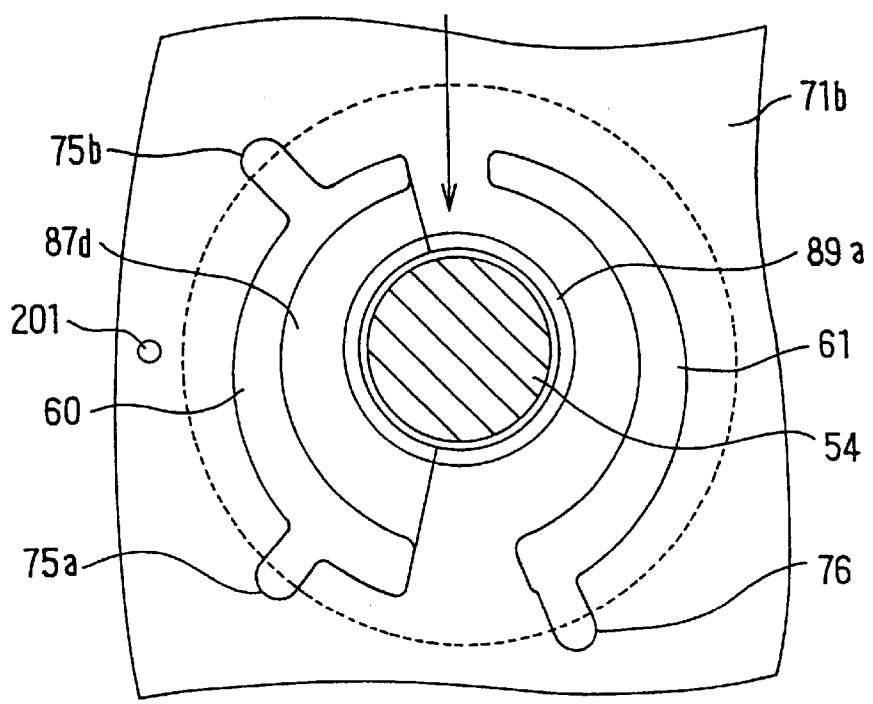
FIG. 8D is a sectional view showing another variation of FIG. 8B.

In place of the fluid grooves 87a and 87b mentioned above, it is possible to provide fluid grooves 87c and 87d in the respective first and second cylinders 71a, and 71b, as described in FIGS. 8C and 8D, each of which is a fan shaped groove extending from the center bores 72a and 72b to all spheres of the crescent shaped intake port 60. The constructions of the fluid grooves 87c and 87d have the same effect as those of the fluid grooves 87a and 87b. Further, even if the fluid grooves 87a and 87b or 87c and 87d are grooves extending from the intake port 60 in the direction to the center bores 71a, and 71b but not reaching the center bores 71a, and 71b, the lubricating effect for preventing the seizure will be brought so far.

On the other hand, it is preferable for increasing a pump efficiency to prevent the fluid leakage from the discharge port 61 to the intake port 60 as much as possible, when the inner and outer rotors 52 and 51 rotate in the pump room 50a. For this purpose, the surfaces of the first and second cylinders 71a, and 71b facing to the pump room 50a are fabricated by grinding in the direction not crossing the intake port 60 and the discharge port 61 as shown by an arrow in the FIGS. 8A and 8B, respectively.

The second and third cylinders 71b and 71c are also provided with fluid grooves 88a and 88b, a fluid path 67 and an intake conduit 62b for the rotary pump 13 which are similar to the fluid grooves 87a and 87b, the fluid path 65 and the intake conduit 60b, respectively. The surfaces of the second and the third cylinders 71b and 71c facing to the pump room 50b are also ground in the similar way as those of the first and second cylinders 71a, and 71b. Thus, the seizure of the rotary pump 13 and the second bearing 92 can be also prevented, while the fluid leakage from the discharge port 63 to the intake port 62 can be effectively prevented.

Figure 9:
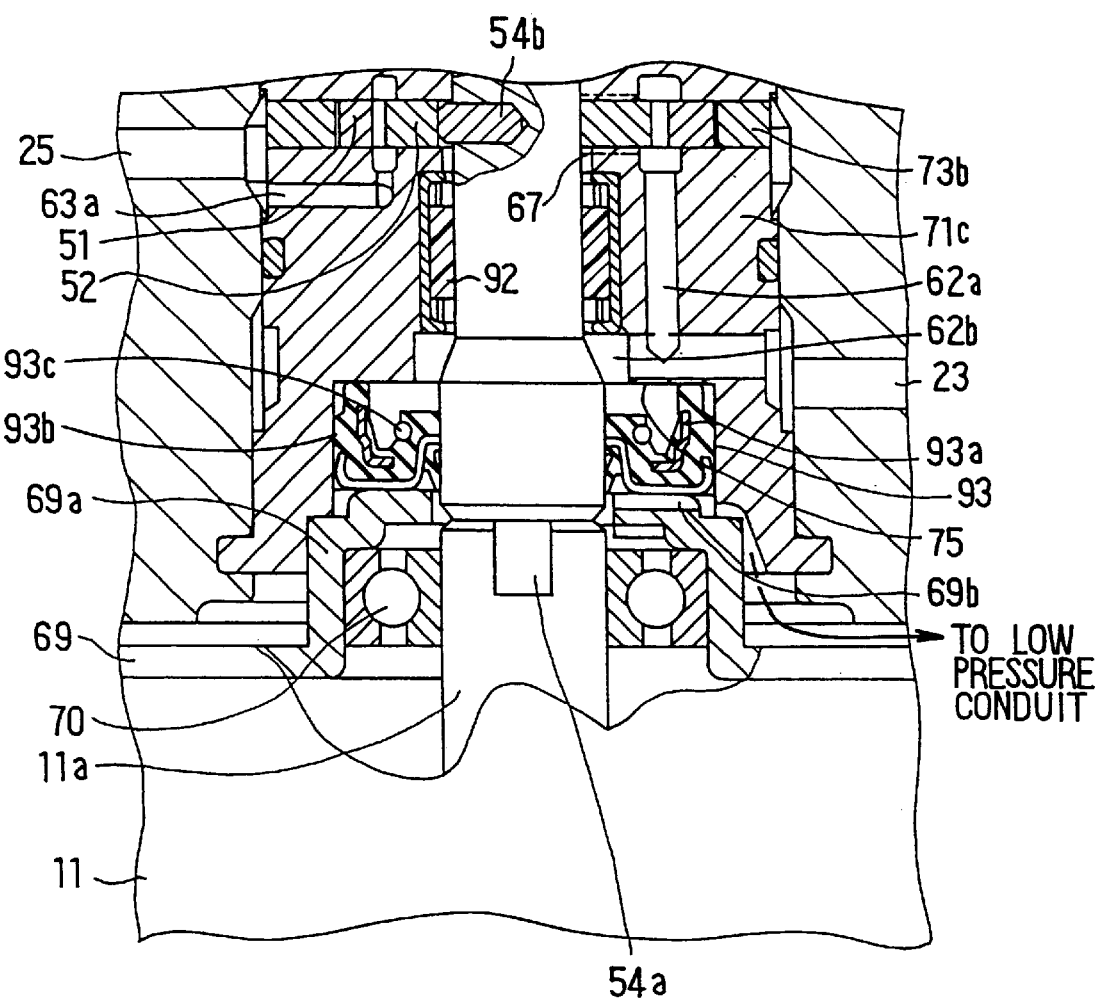
FIG. 9 is an enlarged sectional view of a portion connecting a pump equipment and a motor.

FIG. 9 is an enlarged sectional view with respect to a connecting portion between the pump equipment and the motor.

Figure 2:
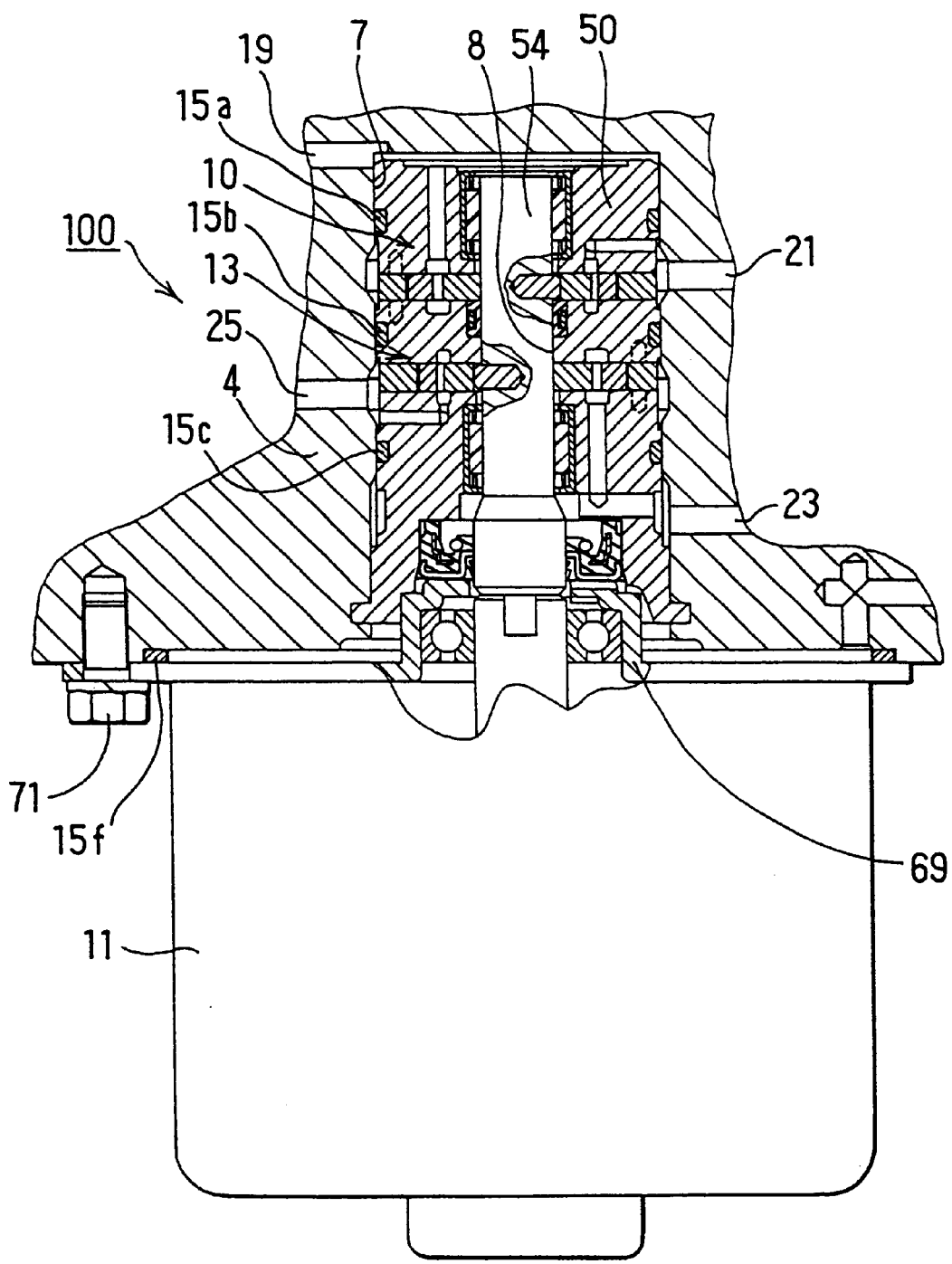
FIG. 2 is a schematic sectional view of a pump equipment.

The motor 11 is fastened with a volt 71 to the cylinder block 4 by providing an o ring 15f and a back up plate 69 for hermetically sealing between the motor 11 and the pump equipment 100, as described in FIG. 2. The back up plate 69 has a projected cylindrical portion 69a extruded to the casing side at its center, as described in FIG. 9. A motor bearing 70 is fixed inside the projected cylindrical portion 69a for rotatably holding a motor shaft 11a of the motor 11. The motor shaft 11a is positioned inside the motor bearing 70 and is coupled with the key 54a of the drive shaft 54.

As the drive shaft 54 is coupled with the motor shaft 11a inside the motor bearing 70, the drive shaft 54 can be smoothly rotated, even if the center axes of the motor shaft 11a and the drive shaft 54 are shifted away from each other. Further, as the back up plate 69 for the oil seal 93 is commonly used for the motor bearing 70, the number of components constituting the pump equipment 100 and the motor 11 is reduced.

The third cylinder is provided at its opening side with a stepwise recess portion 75, the area of which becomes wider step by step. The oil seal 93 is arranged to contact the recess portion 75, the drive shaft 54 and the projected cylindrical portion 69a of the back up plate 69. The oil seal 93 is comprised of a ring member 93a of rigid material, a ring shaped sealing member 93b of elastic material such as rubber surrounding the inner and outer surfaces of the ring member 93a and a coil spring 93c for pressing the sealing member 93b against the drive shaft 54. The sealing member 93b, the cross section of which is shaped V expandable at the side of intake conduit 62b, may be spread out by the fluid pressure to seal the clearance between the third cylinder 71c and the drive shaft 54.

Figure 10:
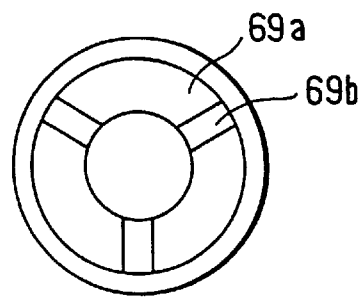
FIG. 10 is an outlook of a projected cylindrical portion of a back up plate viewed from a casing side.

The projected cylindrical portion 69a has grooves 69b for escaping fluid leaked through the oil seal 93 to a low pressure conduit of the hydraulic circuit so that the fluid may be prevented from going into the motor 11, as shown in the FIGS. 2 and 9. The grooves 69b are plural grooves extending in a radial direction on the projected cylindrical portion 69a, as described in FIG. 10.

Figure 11:
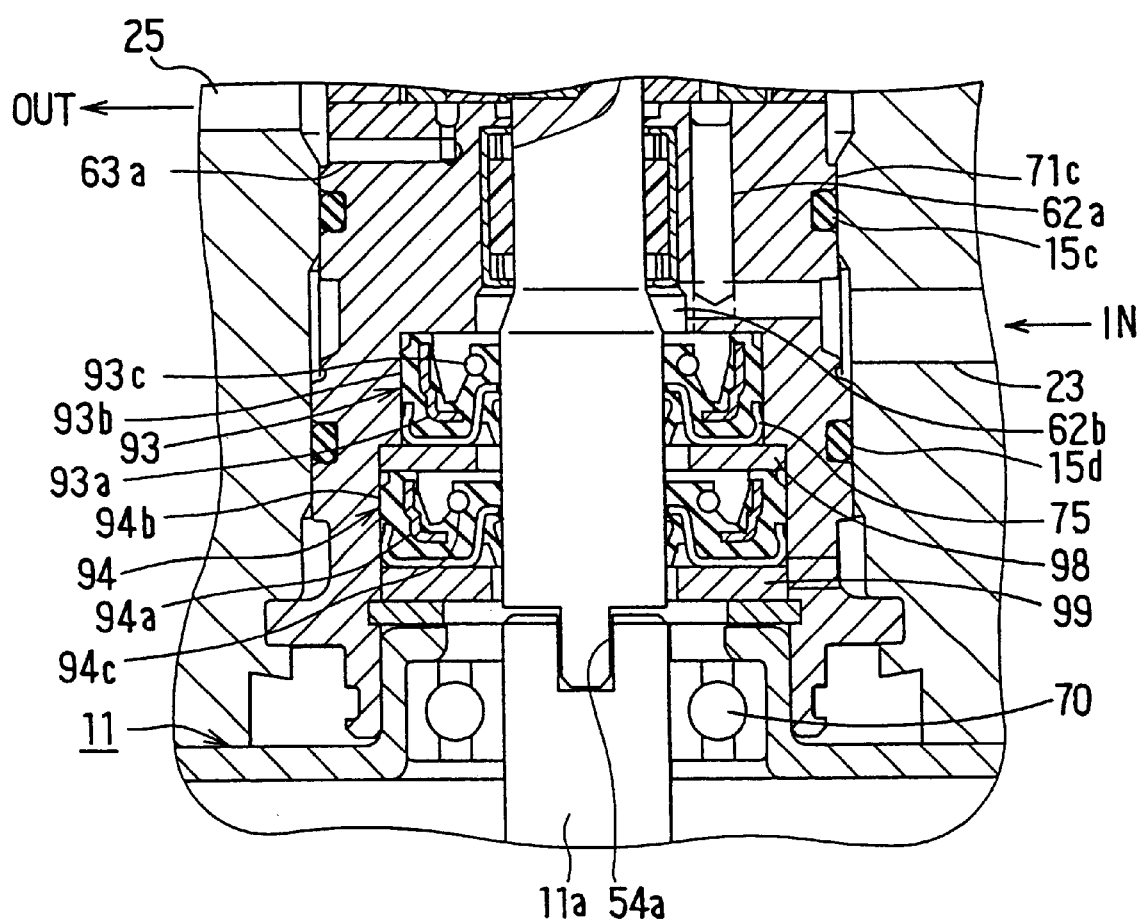
FIG. 11 is a sectional view of a part of the pump equipment having two oil seals.

FIG. 11 shows the pump equipment 100 having two oil seals. According to the embodiment of FIG. 11, in addition to the first oil seal 93 mentioned above with reference to FIG. 9, a second oil seal 94 is tightly fitted into the stepwise recess 75 of the third cylinder 71c in series arrangement with the first oil seal 93 along the drive shaft 54 so that both the first and second oil seals may wrap up the outer surface of the drive shaft 54. Back up plates 98 and 99 are disposed for the first and second oil seals, respectively. None of the back up plates 98 and 99 are commonly used for the motor bearing 70 and no grooves 69b are provided for escaping the brake fluid.

In place of the hermetic sealing between the pump equipment 100 and the motor 11, an o ring 15d is provided for preventing the brake fluid to be flown from the intake conduit 23 to outside. The first oil seal 93 serves to seal brake fluid leaked through the center bore 72c from the intake conduit 62b and, even if the brake fluid is leaked from the first oil seal 93, the second oil seal 94 can play a role of sealing the brake fluid. The second oil seal is comprised of a rigid ring member 94a, an elastic member 94b and a coil spring 94c, the construction and the function of which are similar to those of the rigid ring member 93a, the elastic member 93b and the coil spring 93c, respectively.

Figure 12A:
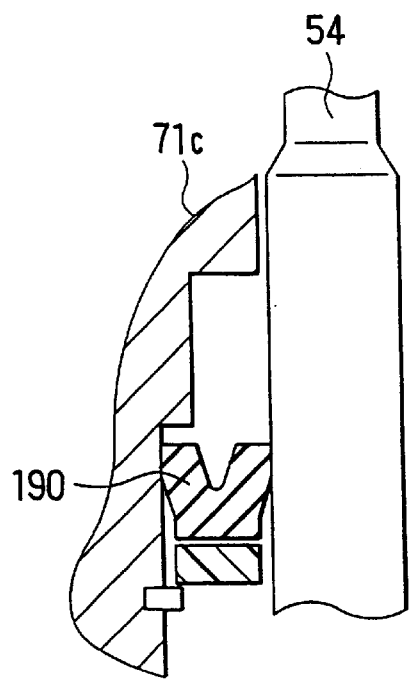
FIG. 12A is a schematic view of an alternative oil seal.
Figure 12B:
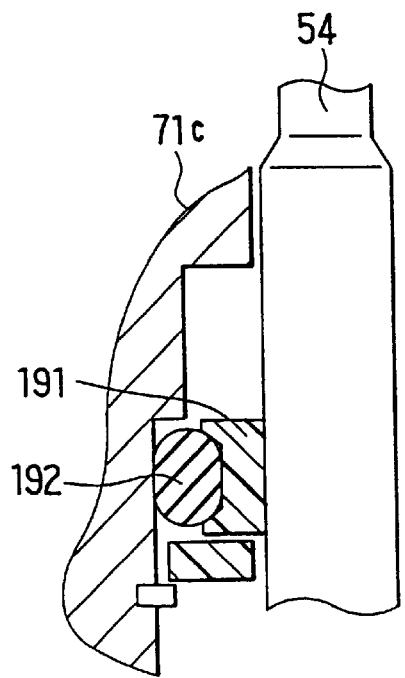
FIG. 12B is a schematic view of another alternative oil seal.

In place of the first or second oil seal, it is possible to employ an oil seal constituted by only an elastic member 190, the cross section of which is shaped V, as illustrated in FIG. 12A or an oil seal constituted by a ring shaped resin member 191 having a groove at its outer periphery and an o ring 192 fitted into the groove of the resin member 191, as illustrated in FIG. 12B.

Figure 13:
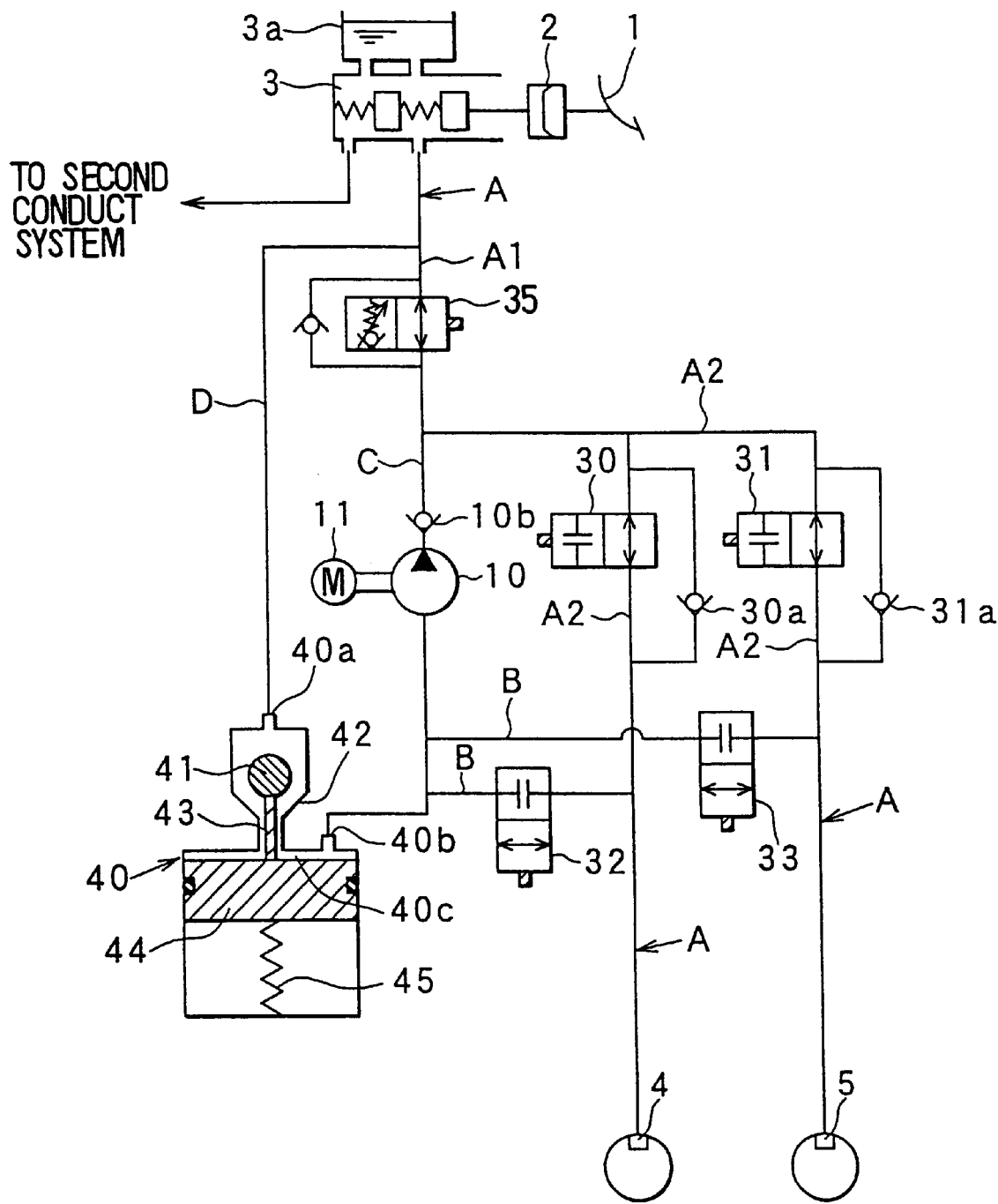
FIG. 13 is an outline structure of an alternative brake apparatus.

FIG. 13 shows an alternative outline structure of the brake apparatus described in FIG. 1. The parts and components of this embodiment, the structure and function of which are similar to those described in FIG. 1, have the same reference numbers as those of FIG. 1 and the explanation will be omitted.

In place of the control valve 40 and the proportioning valve 22, a linear differential pressure control valve 35 is employed for holding the pressure difference between the first conduit A1 with the master cylinder pressure and the second conduit A2 with the wheel cylinder pressure. The setting value of the pressure difference of the linear differential pressure control valve 35 is linearly adjustable. Further, in place of the control valve 34, the check valve 21 and the reservoir 20, a reservoir 40 is employed in this embodiment.

The reservoir 40 is provided with a reservoir hole 40a connected with the conduit D for receiving brake fluid from the side of the master cylinder 3 and a reservoir hole 40b connected with the conduits B and C for receiving brake fluid released from the wheel cylinders 4 and 5. A valve of ball 41 is disposed inside the reservoir hole 40a. A rod 43 is connected to the valve of ball 41 for moving up and down the valve of ball 41 under the given stroke.

Inside reservoir room 40c, there are provided with a piston 44 connected with the rod 43 and a spring 45 pressing the piston 44 toward the valve of ball 41. The reservoir 40 is operative so as to interrupt brake fluid to be flown into the reservoir 40 by making the valve of ball 41 contact with a valve sheet 42 once a predetermined amount of brake fluid is stored inside the reservoir room 40c. Therefore, the brake fluid exceeding the intake capacity of the rotary pump 10 will never flow into the reservoir room 40c so that high pressure may not be applied to the intake side of the rotary pump 10.

Figure 14:
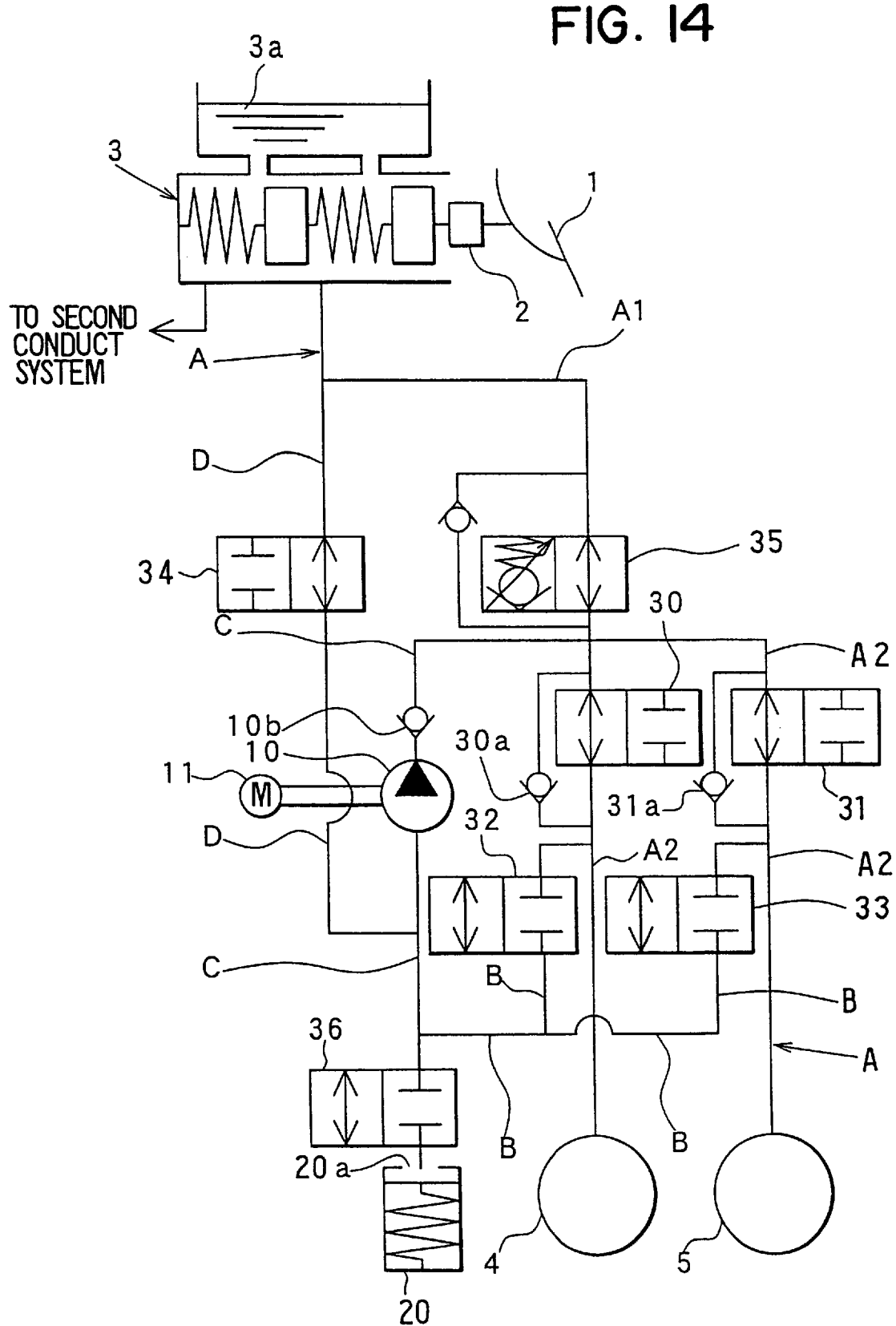
FIG. 14 is an outline structure of a further alternative brake apparatus.

FIG. 14 shows a further alternative outline structure of the brake apparatus described in FIG. 1. The parts and components of this embodiment, the structure and function of which are similar to those described in FIG. 1, have the same reference numbers as those of FIG. 1 and the explanation will be omitted. In place of the control valve 40 and the proportioning valve 22, a linear differential pressure control valve 35 is employed for holding the pressure difference between the first conduit A1 with the master cylinder pressure and the second conduit A2 with the wheel cylinder pressure, as described in FIG. 13. Further, in place of the check valve 21, a control valve 36 is disposed at the conduit C connecting to the reservoir hole 20a for controlling brake fluid to be communicated with the reservoir 20. The control valve 34 is normally in a communicating state and, when the rotary pump 10 is driven, turns to be in an interrupting state so as to control brake fluid supply through the conduit D according to the requirement of the brake fluid to be sucked by the rotary pump 10.

In the hydraulic circuit of the brake apparatus as described in FIGS. 1, 13 and 14, the intake conduit C corresponding to the intake conduits 19, 60a and 60b and to the rotary pump 10 is exposed to a high pressure state, when the control valve 34 is in the communicating state in the FIGS. 1 and 14, when foreign material is bitten between the reservoir hole 40a and the valve sheet 42 in FIG. 13, and when pressure reducing control valves 32 and 33 are failed or foreign material is bitten in the safety valve 10b. The intake conduits 23, 62a and 62b to the rotary pump 13 are also exposed to a high pressure state in the same way as mentioned above in the rotary pump 10. Therefore, the pump equipment having two oil seals 93 and 94 described in FIG. 11 will have a good quality of brake fluid sealing.

Figure 15:
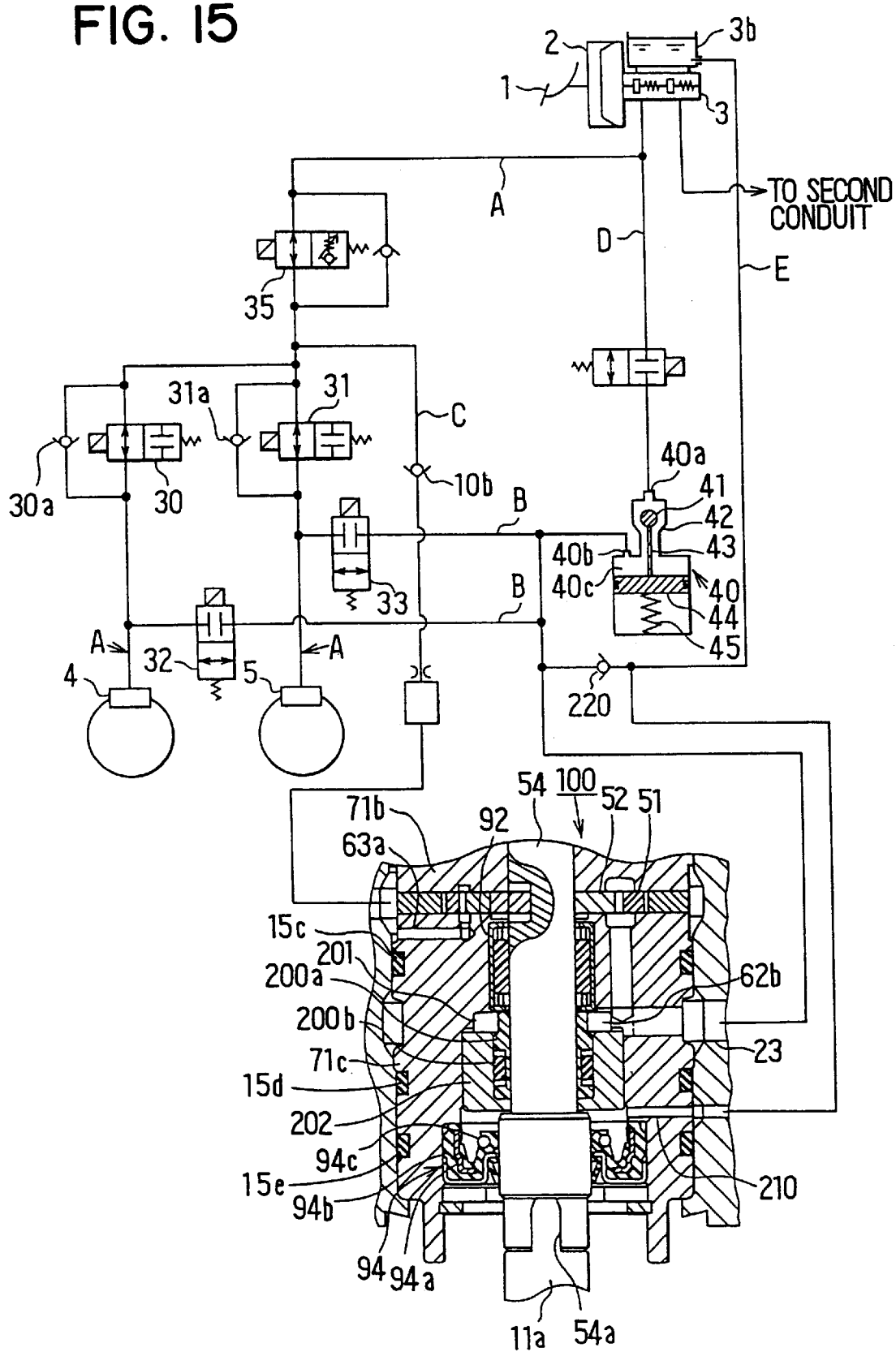
FIG. 15 is a structure of a further alternative hydraulic circuit and pump equipment.

FIG. 15 shows a structure of a further alternative hydraulic circuit and pump equipment in which a connection of the hydraulic circuit and the pump equipment is schematically described. As the construction of this embodiment is similar to that of the hydraulic circuit described in FIG. 13 and that of the pump equipment described in FIG. 11, only different portions will be explained and the explanation with respect to the portions having the same reference number marked in FIGS. 11 and 13 will be omitted.

Figure 16A:
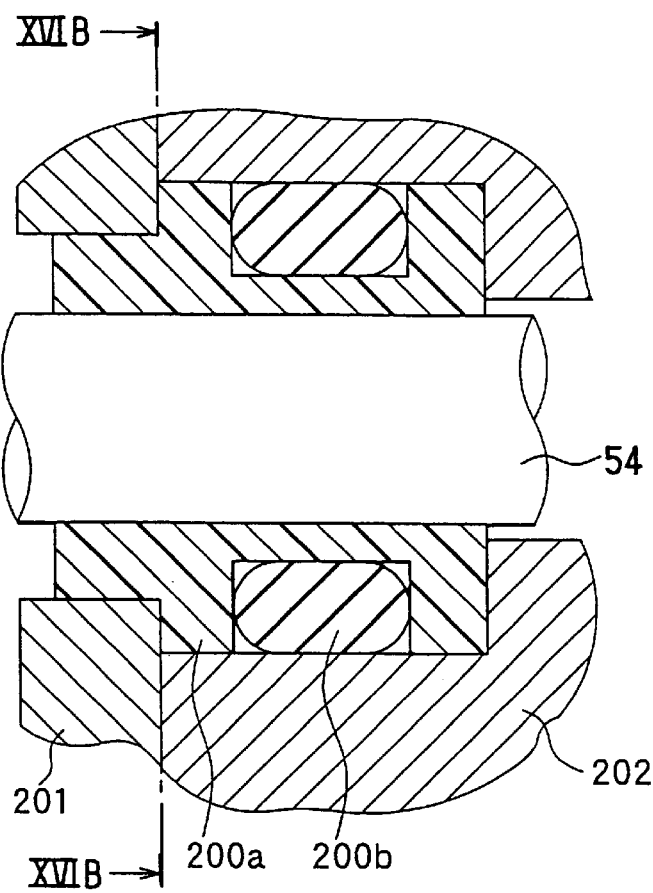
FIG. 16A is an enlarged sectional view of a first oil seal.
Figure 16B:
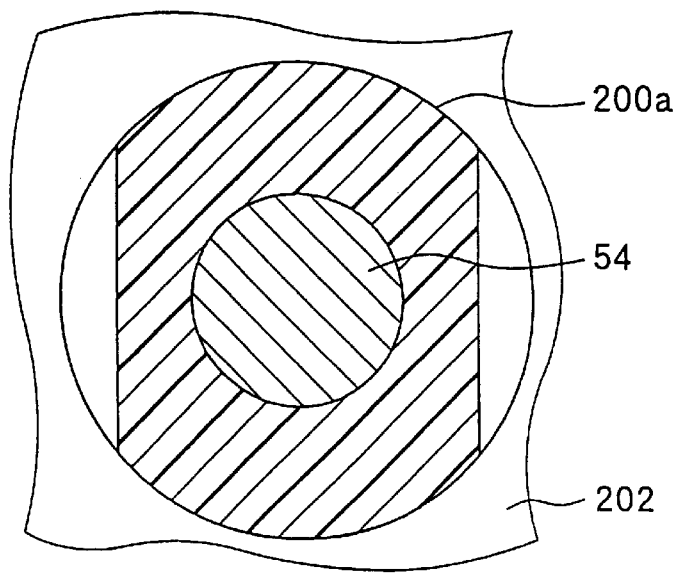
FIG. 16B is a sectional view taken along a line XVIB—XVIB of FIG. 16A.

In place of the first oil seal 93 in FIG. 11, a first oil seal 200 is employed in this embodiment. An enlarged sectional view of the first oil seal 200 is shown in FIGS. 16A and 16B. FIG. 16B is a sectional view taken along a line XVIB—XVIB of FIG. 16A. The first oil seal 200 is provided with a nearly cylindrically shaped resin member 200a arranged to surround the drive shaft 54 and an o ring 200b arranged to cover the outer surface of the resin member 200a. A groove, the depth of which is provided in a diameter direction of the drive shaft 54, is constituted on the outer circumference of the resin member 200a. The o ring 200b is fitted into this groove. The first oil seal 200 is held at a given place along the drive shaft 54 by ring member 201 and a fixed member 202. The ring member 201 is inserted inside the stepwise recess of the third cylinder 71c and then the resin member 200a with the o ring 200b is inserted into the inside of the ring member 201. The fixed member 202 is press fitted into the stepwise recess of the third cylinder 71c so as to surround the first oil seal 200 at the given place along the drive shaft 54. The ring member 201 is rigidly fitted between the third cylinder 71c and the fixed member 202, as the ring member 201 is pressed down by the fixed member 202 and press fitted into the third cylinder 71c.

A cross section of one end portion of the resin member 200a at the side of the ring member 201 has an arc shape formed by partly cutting off a near circle, as described in FIG. 16b. The ring member 201 has a hollow shape corresponding to the end portion of the resin member 202 to be able to insert the end portion of the resin member 202 into the hollow of the ring member 201. Even if the drive shaft 54 rotates within the resin member 202, the resin member 202 cannot be rotated with the drive shaft 54, as the resin member 202 is fixed inside the ring member 201. Therefore, the o ring 200b will never be worn out by the rotation of drive shaft 54 and the long life endurance of the o ring 200b may be secured.

The third cylinder 71c is provided with a communicating path 210 for communicating a space between the first oil seal 200 and the second oil seal 94 to outside. Further, between the outer surface of the third cylinder 71c and the inner surface of the cylinder block 4, an o ring 15e is disposed between the communicating path 210 and the outside in order for brake fluid from the communicating path 210 not to leak to the outside through the gap between the outer surface of the third cylinder 71c and the inner surface of the cylinder block 4.

Furthermore, in addition to the structure of the hydraulic circuit described in FIG. 13, the hydraulic circuit of this embodiment is provided with a conduit E connecting the conduit B and the master reservoir 3b and a check valve 220 for preventing the brake fluid to flow from conduit B to conduit E where the fluid pressure is lower than that of the conduit B, as shown in FIG. 15. Though the connection of the hydraulic circuit with the pump equipment 100 is described schematically in FIG. 15, the intake conduit 23 and the discharge conduit 25 correspond to a part of the conduit B and a part of conduit C, respectively. The communicating path 210 is connected to conduit E at a place between the check valve 220 and the master reservoir 3b. Therefore, the brake fluid pressure in the communicating path 210 becomes lower than that of the intake conduit 23.

In the brake apparatus construction as mentioned above, the first oil 200 can seal the high pressure brake from being fluid sucked into the intake conduit 62b through the intake conduit 23. Even if the high pressure brake fluid passes through the first oil seal 200, the fluid is returned to the conduit E through the communicating path 210 and can be sealed by the second oil seal 94, because the second oil seal 94 cannot be exposed to the high pressure brake fluid. Therefore, the employment of the first and second oil seals 200 and 94 as mentioned above will serve to improve the sealing quality.

The above construction is one of the examples that the second oil seal 94 is not exposed to the high pressure brake fluid, even if the brake fluid passes through the first oil seal 200. In place of the conduit E, it is possible to employ the construction as described in FIGS. 17A and 17B, each of which shows only a portion near the communicating path 210 relevant to an alternative embodiment.

Figure 17A:
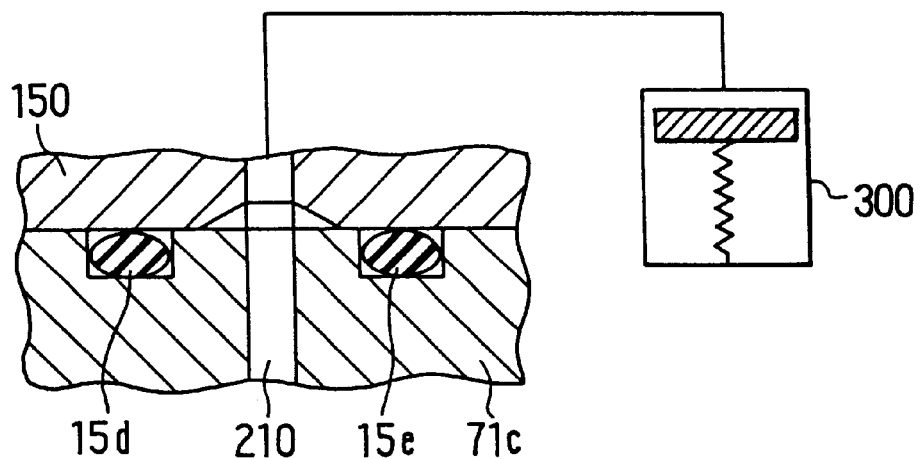
FIG. 17A is a schematic view of a reservoir connected to a communicating path.

FIG. 17A describes a construction that the communication path 210 is connected to a reservoir 300 provided separately in addition to the reservoir 40. When the high pressure brake fluid is applied to the intake conduit 62b and is leaked through the first oil seal 200, the leaked brake fluid is stored in the reservoir 300 and, when the fluid pressure within the reservoir 300 becomes higher than that of the intake conduit 62b, the stored brake fluid may return to the intake conduit 62b.

Figure 17B:
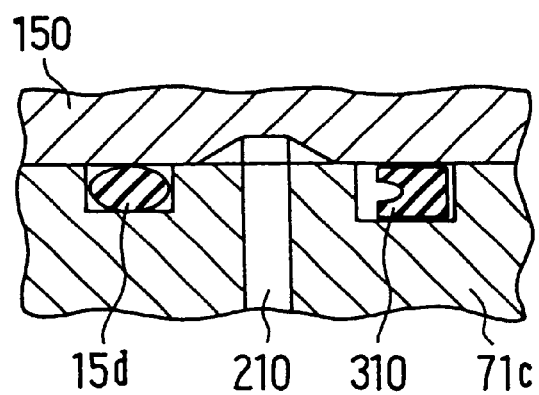
FIG. 17B is a schematic construction of a cup seal.

FIG. 17B describes a construction that, in place of the o ring 15e described in FIG. 15, there is provided with a cup seal 310 made of elastic material, the cross section of which is shaped V opened at the side of the communicating path 210. The leaked brake fluid from the communicating path 210 can be stored in the space formed at the opening side of the cup seal 310.

Even if the o ring described in FIG. 15 is employed and, if a space sufficient to store the brake fluid from the communicating path 210 can be provided at the outer surface of the third cylinder 71c between the communicating path 210 and the o ring, the conduit E described in FIG. 15 may be eliminated.

Figure 18A:
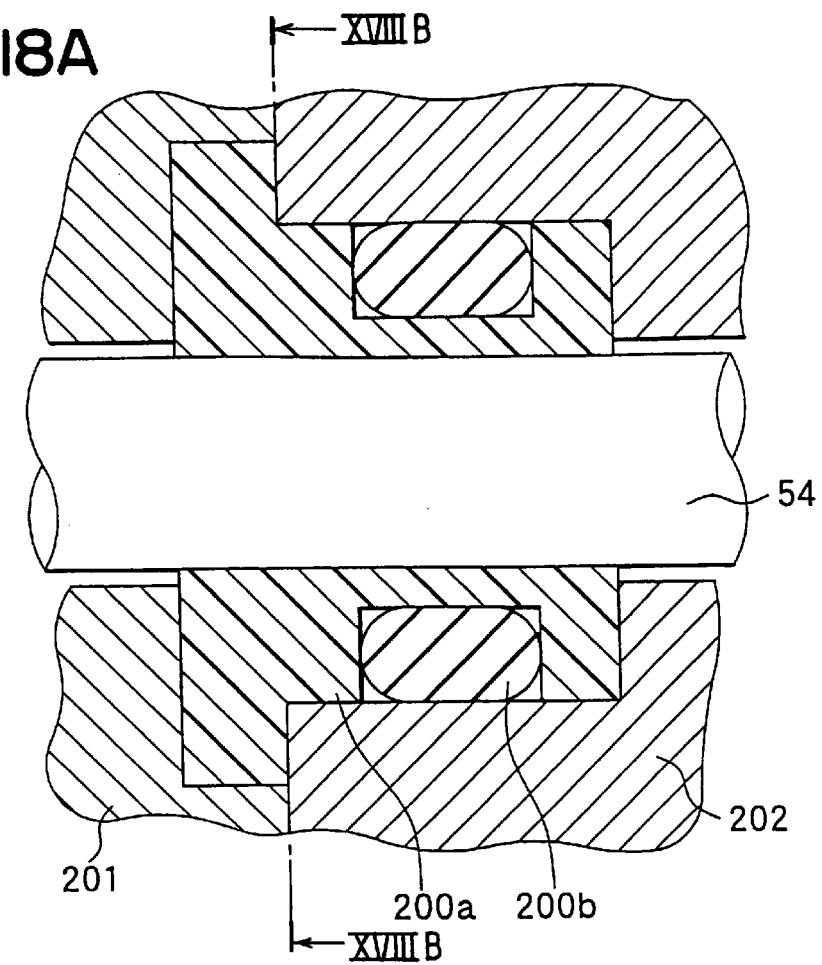
FIG. 18A is an enlarged sectional view of an alternative first oil seal.
Figure 18B:
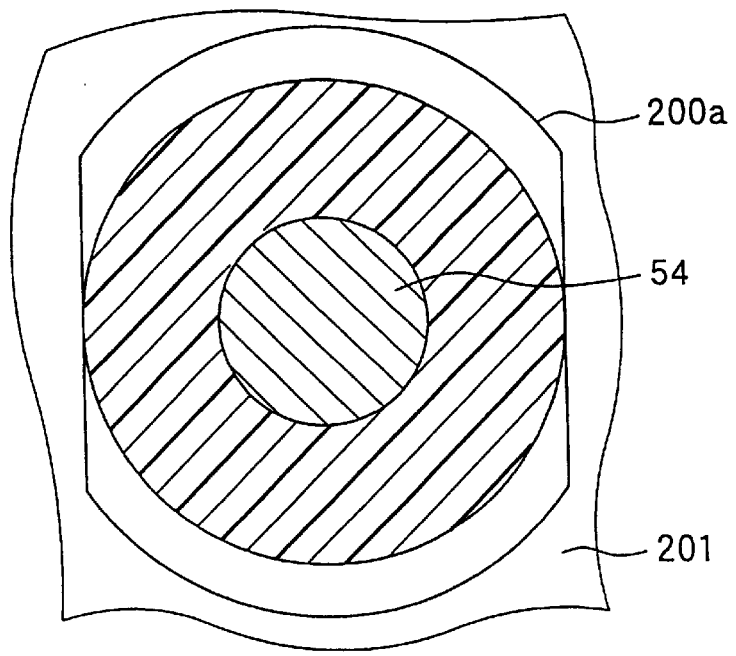
FIG. 18B is a sectional view taken along a line XVIIIB—XVIIIB of FIG. 18A.
Figure 19A:
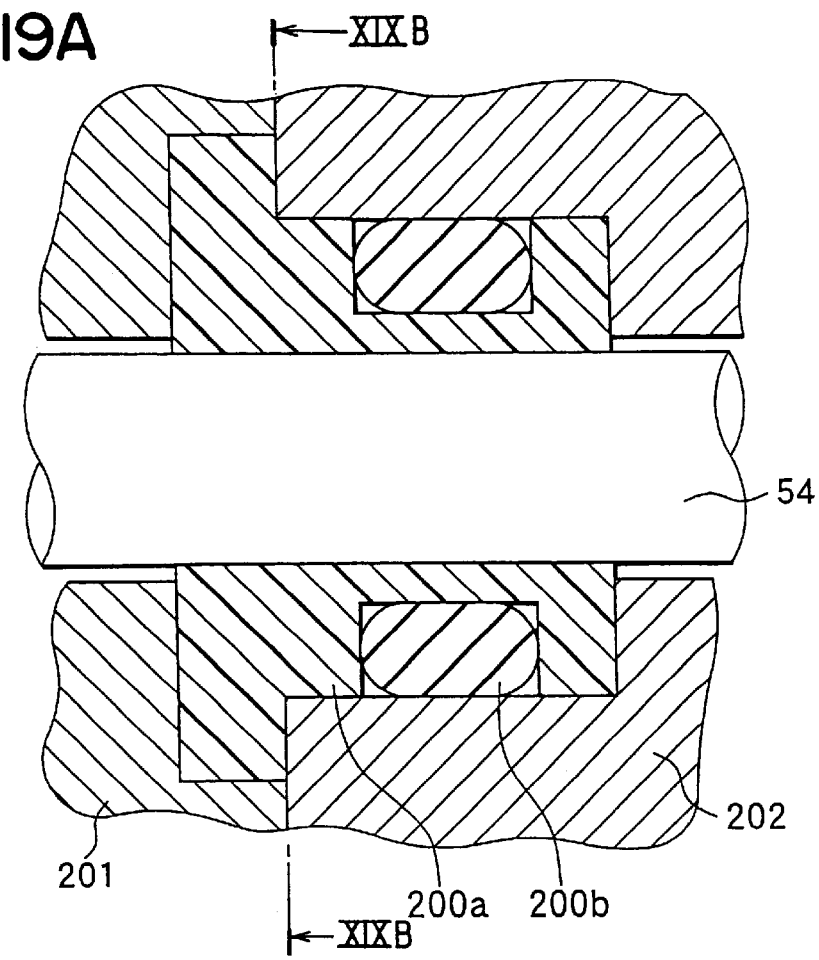
FIG. 19A is an enlarged sectional view of a further alternative first oil seal.
Figure 19B:
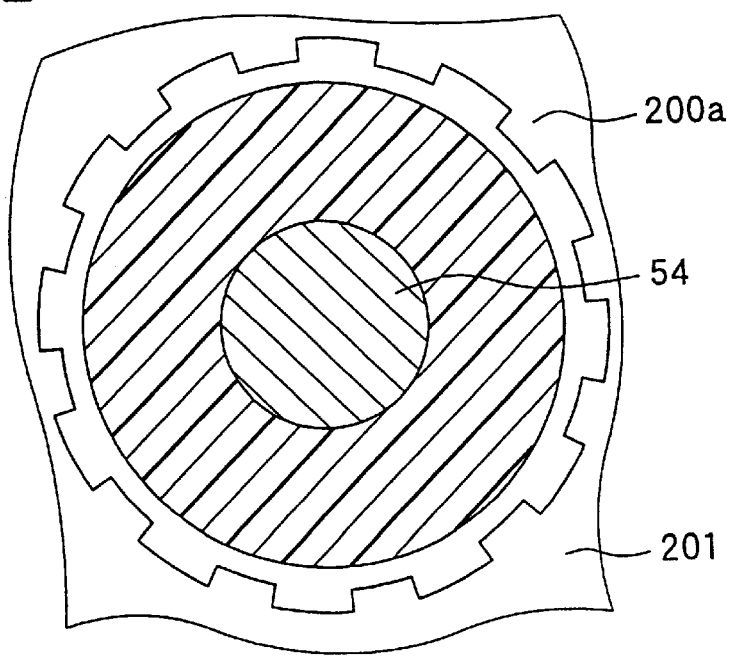
FIG. 19B is a sectional view taken along a line XIXB—XIXB of FIG. 19A.

Further, in place of the construction of the first oil seal 200 described in FIGS. 16A and 16B, it is possible, for the purpose of not rotating the first oil seal 200 with the drive shaft 54, to employ a construction as shown in FIGS. 18A and 18B. The resin member 200a has one end portion, the diameter of which is larger than that of the other portion, for constituting a flange thereon. The flange is a shaped arc formed by partly cutting off the circumference thereof and the ring member 201 is also shaped to correspond to the arc shape of the flange. As an alternative way, the flange may be shaped at the circumference thereof to have plural notches such as splines as described in FIGS. 19A and 19B.

Figure 20:
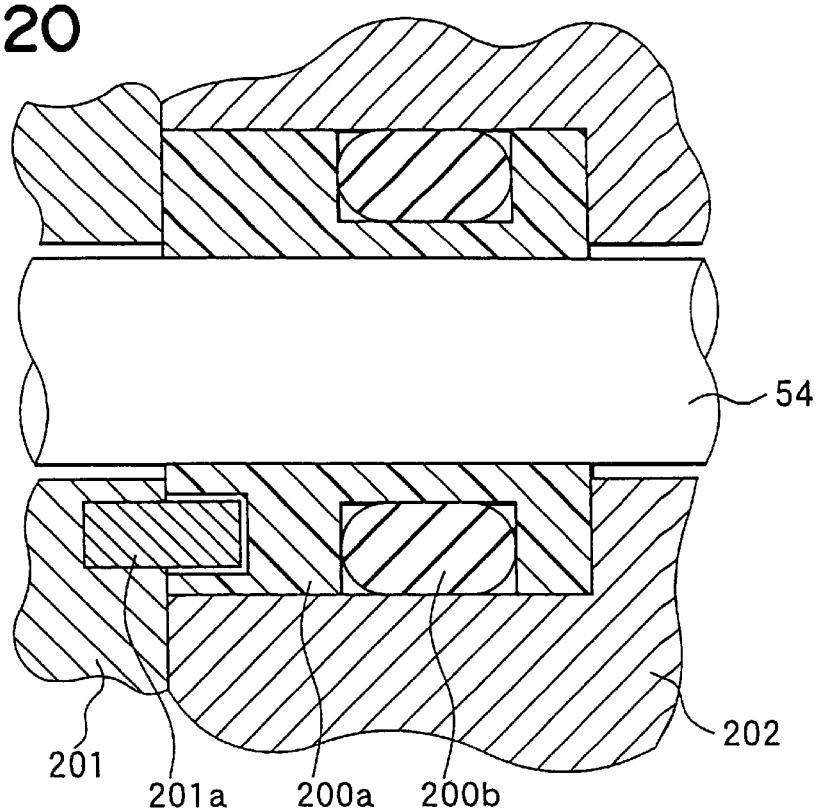
FIG. 20 is an enlarged sectional view of a variation of the first oil seal.
Figure 21:
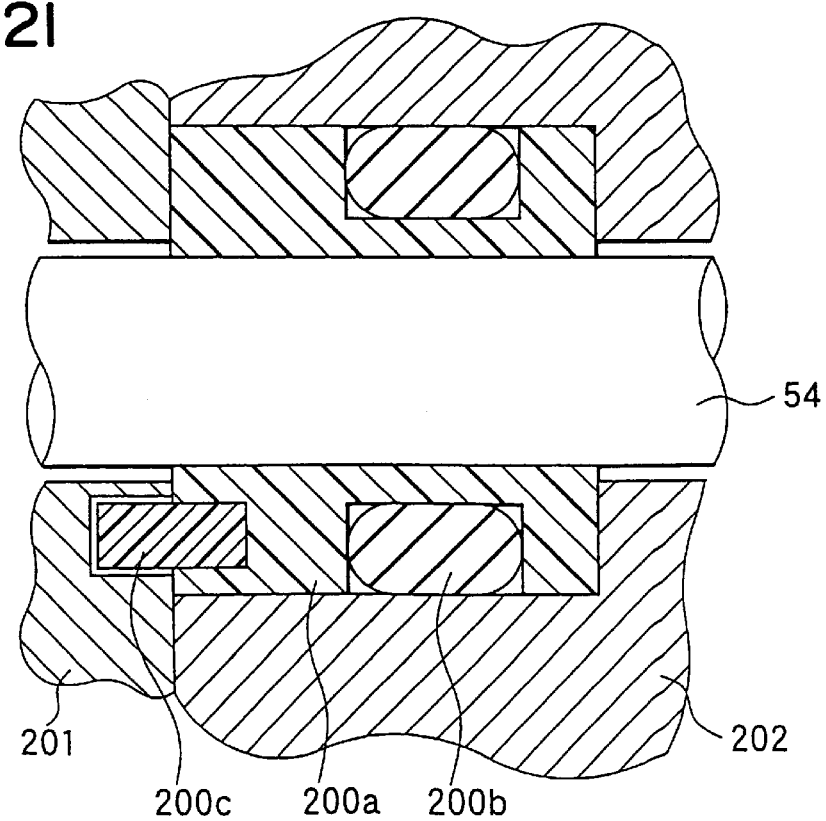
FIG. 21 is an enlarged sectional view of another variation of the first oil seal.

Furthermore, the first oil seal 200 and the ring member 201 may have a construction for the same purpose that the ring member 201 is provided with a projection 201a and the resin member 200a with a hollow corresponding to the projection 201a so as to fit the projection 201a into the hollow of the resin member 200a, as described in FIG. 20. On the other hand, it is possible to employ a construction described in FIG. 21, as a vice versa, that the resin member 200a is provided with a projection 200c and the ring member 201 with a hollow corresponding to the projection 200c so as to fit the projection 200c into the hollow of the ring member 201.

Figure 22:
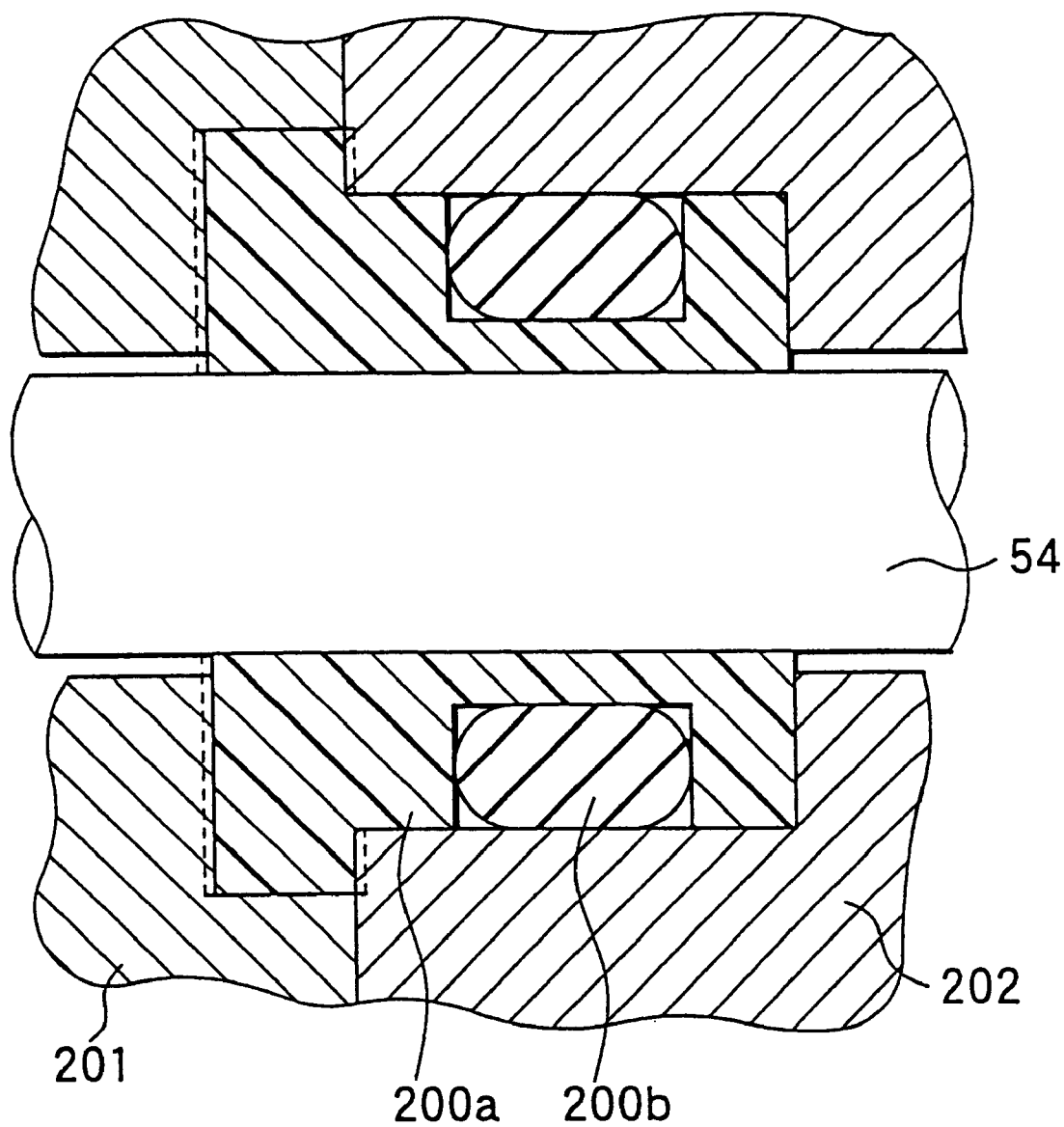
FIG. 22 is an enlarged sectional view of a further variation of the first oil seal.

Not to rotate the resin member 200a with the drive shaft 54, it is possible to employ a construction described in FIG. 22. The resin member 200a has a flange portion. A dotted line in FIG. 22 shows the original thickness of the flange portion at a stage before fixing the resin member 200a by the ring member 201 and the fixed member 202. The resin member 200a may be rigidly fixed in such a way that the ring member 201 and the fixed member 202 compress the flange portion of the resin member 200a toward an axis direction of the drive shaft 54.

Figure 23:
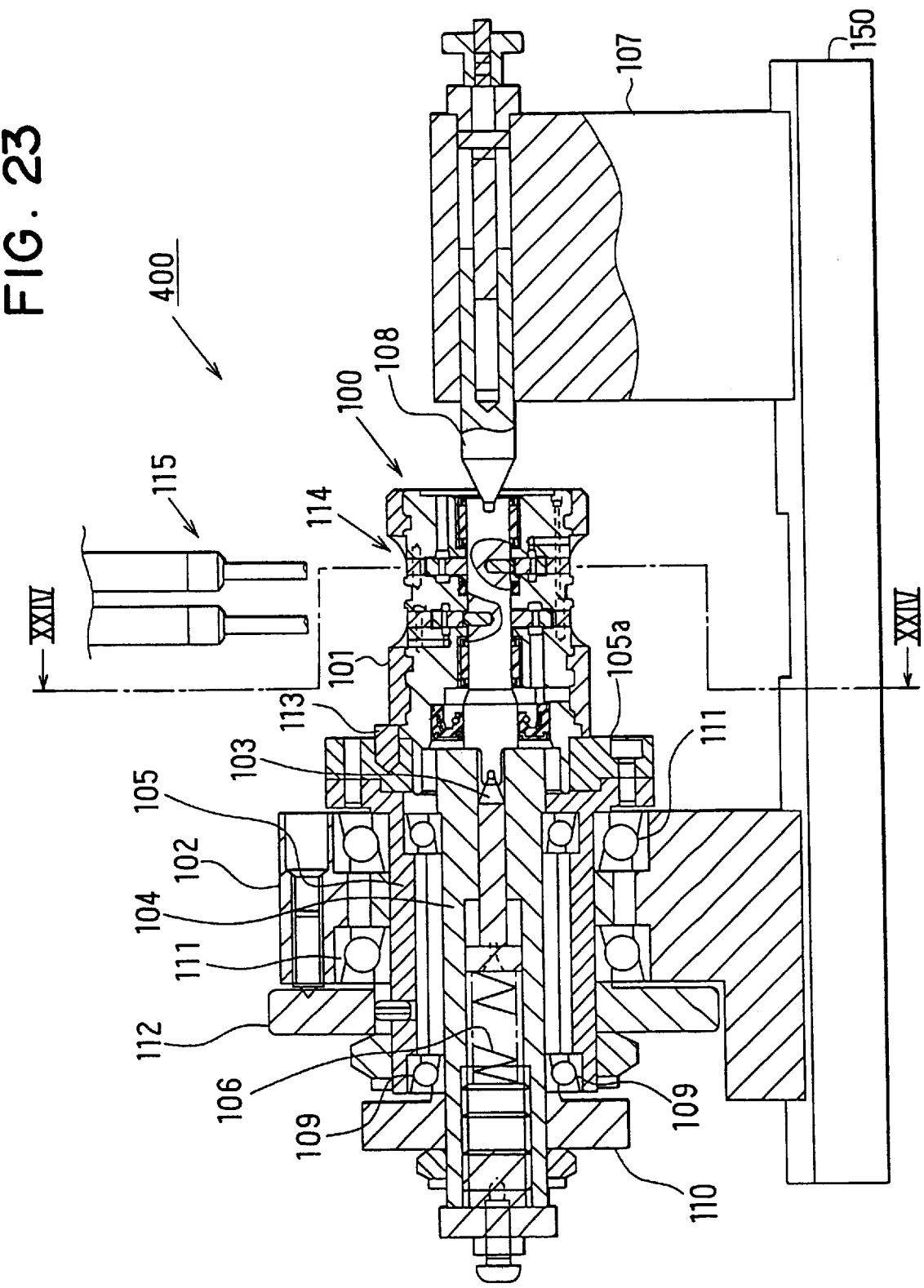
FIG. 23 is a sectional view of a welding equipment.
Figure 24:
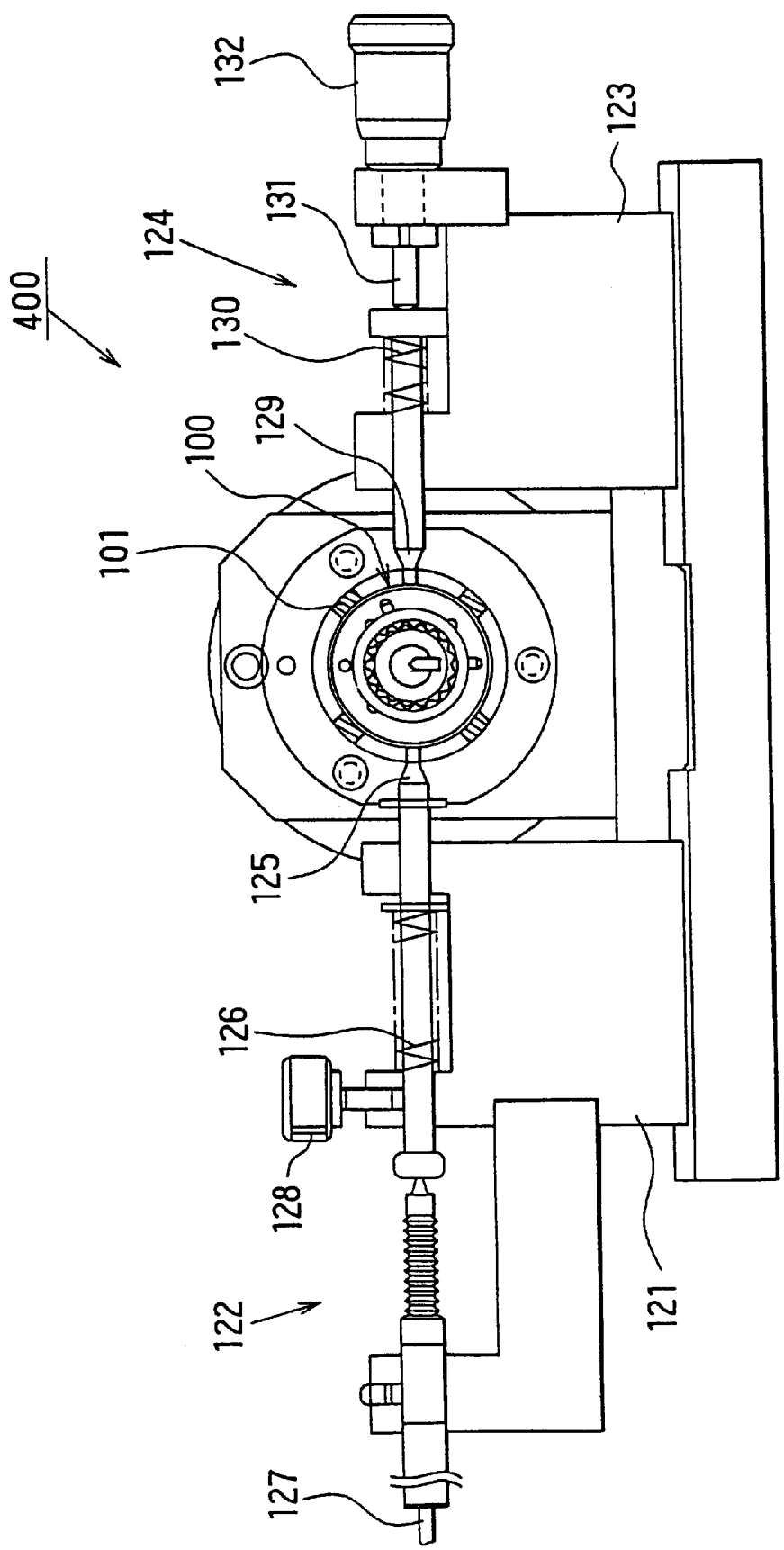
FIG. 24 is an outlook viewed from a line of XXIV—XXIV of FIG. 23.

A method for welding the outside surface of the casing 50 of the pump equipment 100 will be described hereinafter. FIG. 23 shows a sectional view of a welding equipment provided with the pump equipment 100. FIG. 24 is viewed from a line of XXIV–XXIVA of FIG. 23.

The welding equipment 400 is provided with a holder 101 for holding the pump equipment 100. The holder 101 is fixed on a basement 150 through a housing 102. The housing is provided with a circular opening portion within which a shaft 105, a cylindrical shaft 104 inserted into the shaft 105 and a pole shaped center pin 103 inserted into the cylindrical shaft 104 are arranged, respectively. The outer diameter of the shaft 105 is nearly same as that of the holder 101. The holder 101 is fixed on the shaft 105. An end surface 105a of the shaft 105 on which the holder 101 is installed is a reference surface for the position setting of the pump equipment 100. By connecting the flange 74d of the pump equipment 100 to the end surface 105a of the shaft 105, the axial direction position setting of the pump equipment 100 can be made.

The drive shaft 54 is held for the position setting between a center pin 108 fixed through a stay 107 on the basement 150 and the center pin 103 biased by a spring 106 toward the center pin 108. The ball bearing 109 is installed between the inner surface of the shaft 105 and the outer surface of the shaft 104 so that the shaft 104 may be rotated within the shaft 105. The shaft 104 is provided with a knob 110 for rotating the shaft 104 at its end portion opposite to the side of the holder 101. The bore provided in the shaft 104 has a rectangular cross section to be able to insert the key 54a of the drive shaft 54. When the pump equipment 100 is held in the holder 101, the key 54a is fitted into the bore of the shaft 104 and, if the knob 110 is rotated, the drive shaft 54 is rotated with the shaft 104. Therefore, the rotation sway of the drive shaft 54 can be accurately adjusted.

The ball bearing 111 is installed between the inner surface of the housing 102 and the outer surface of the shaft 105 so that the shaft 105 may be rotated within the housing 102. The shaft 105 is provided with a knob 112 for rotating the shaft 105 and the holder 101 at its end portion opposite to the side of the holder 101. A pin 113 for a circumference position setting is provided on the shaft 105. The circumference rotation of the pump equipment 100 may be restricted by the pin 113 and a recess (not shown) to be engaged with the pin 113.

The holder 101 has window portion 114 partly opened in its outer circumference, through which welding portions of the pump equipment 100 can be observed. A laser beam emitting device for welding is arranged at the position confronting the window portions 114 and the welding on the pump equipment 100 and may be operated through the window portions 114.

The position setting of the pump equipment 100 in an axial direction of the drive shaft 54 can be made by the holder 101, the center pins 103 and 108 and the end surface 105a, as described in FIG. 23.

For making the position setting of the pump 100 in a circumference direction, a position detecting sensor device 122 fixed through a stay 121 on the basement 150 is arranged at a position confronting one side of the circumference of the holder 101 and an adjusting pin device 124 is fixed through a stay 123 on the basement 150 at a position confronting the other side of the circumference of the holder 101, as described in FIG. 24.

The position detecting sensor device 122 is provided with a measuring probe 125 for contacting the pump equipment 100 set in the holder 101, a spring 126 for pressing forward the measuring probe 125 and a sensor portion 128 for generating a digital signal showing the position of the measuring probe 125 through a code 127 to an amplifier. The measuring probe 125 is fitted into a bore provided in the stay 121 and can be moved to contact the pump equipment 100 by the biasing force of the spring 126.

The adjusting pin device 124 is provided with a measuring probe 129 for pushing the pump equipment 100, a spring for preventing the measuring probe 129 from being shaken and an adjusting knob 132 for adjusting the position of the measuring probe 129 by moving a contact element 131. The measuring probe 129 is fitted into a bore provided in a stay 123 to be able to be moved therein and its position is adjustable by the adjusting knob 132.

Next, the method for assembling the pump equipment 100 will be explained by using the welding equipment 400 mentioned above. After containing the outer and inner rotors 51 and 52 into the first and second cylindrical center plates 73a and 73b, respectively, the third cylinder 71c, the second cylindrical center plate 73b, the second cylinder 71b, the first cylindrical center plate 73a and the first cylinder 71a, are sequentially piled up into the drive shaft 54. At this time, the pins 251 and 252 are arranged in the hole 201 of the first cylindrical center plate 73a and in the hole 202 of the second cylindrical center plate 73b, respectively. The pins 251 and 252 are inserted into the corresponding recesses of the first, second and third cylinders 71a, 71b and 71c, respectively.

The first cylindrical center plate 73a is held between the first and second cylinders 71a, and 71b so as to be pivotally rotated with respect to the pin 251 and the second cylindrical center plate 73b between the second and third cylinders 71b and 71c so as to be pivotally rotated with respect to the pin 252. By pivoting the first and second cylindrical center plates 73a and 73b centering around the pins 251 and 252, respectively, the position setting of the first and second cylindrical center plates 73a and 73b can be made with respect to the first, second and third cylinders 71a, 71b and 71c.

As a next step after having been piled up as mentioned above, the first, second and third cylinders 71a, 71b and 71c and the first and second cylindrical center plates 73a and 73b are contained in the holder 101 in a state that the third cylinder contacts the end surface 105 for setting the position of the pump equipment 100 in the axial direction. The pins 251 and 252 are positioned up and down with respect to the drive shaft 54, respectively.

For setting the position of the pump equipment 100 in the circumference direction, the measuring probe 129 is moved by the adjusting knob 132 until the first, second and third cylinders 71a, 71b and 71c or the first and second cylindrical center plates 73a and 73b are moved to the most right position. As clearances exist firstly between the outer and inner rotors 51 and 52, secondly between the inner rotor 52 and the drive shaft 54 and between the outer rotor 51 and thirdly the first or second cylindrical center plate 73a or 73b, the first, second and third cylinders 71a, 71b and 71c or the first and second cylindrical center plates 73a and 73b are moved to the right so as to bring all of the respective clearances together to the left side or the right side.

Then, the measuring probe 129 is moved by the adjusting knob 132 until the first and second cylindrical center plates 73a and 73b or the first, second and third cylinders 71a, 71b and 71c are moved to the most left position by a distance corresponding to an accumulated value of the respective clearances. Therefore, the measuring probe 125 at the opposite side is moved from the most right position to the most left position or vise versa so that the accumulated value of the clearances among the first or second cylindrical center plate 73a or 73b, the outer rotor 51, the inner rotor 52 and the drive shaft 54 may be detected by the sensor portion 128, which generates the digital signal responsive to the value of the accumulated clearances.

Based on the value of the detected clearances, the first, second and third cylinders 71a, 71b and 71c or the first and second cylindrical center plate 73a and 7b are moved back not to bring one sided clearances but to secure adequate and accurate clearances by the adjusting knob 132 and, then, held by both of the measuring probes 125 and 129. The circumference position setting of the first, second and third cylinders 71a, 71b and 71c or the first and second cylindrical center plate 73a and 7b is made as mentioned above, that is, the circumference position setting of the pump equipment 100 can be made only by pivoting the first and second cylindrical center plate 73a and 7b centering around the pins 251 and 252.

After finishing the axial and circumference position setting of the pump equipment 100, the first, second and third cylinders 71a, 71b and 71c or the first and second cylindrical center plate 73a and 73b are temporally fixed by spot welding in use of the laser beam for welding from the laser emitting device 115. It is preferable not to use too strong a laser beam, when the tentative spot welding is made from one side position, for limiting a deformation of the first, second and third cylinders 71a, 71b and 71c or the first and second cylindrical center plate 73a and 73b.

On the other hand, when the laser beams are emitted from plural side positions counterbalance each other the respective forces given by the laser beams, the stronger laser beams may be used for the spot welding so that the stronger tentative fixing may be realized, compared with the laser beam for the spot welding from the one sided position.

After finishing the tentative welding on the pump equipment 100, the pump equipment 100 is removed from the welding equipment 400 and, then, all around peripheral borders constituted by the first cylinder 71a, the first cylindrical center plate 73a, the second cylinder 71b, the second cylindrical center plate 73b and the third cylinder 71c are welded by the other welding equipment in order to complete the pump equipment 100 having two rotary pumps 10 and 13.

On the other hand, if the laser beams from plural side counterbalance each other the respective forces given by the laser beams are applied to the welding portions, the tentative spot welding may be eliminated. By rotating the pump equipment 100 in using knob 112 for rotating the holder 101 after finishing the axial and circumference position setting of the pump equipment 100, the peripheral borders thereof can be welded without causing the deformation or the position shift.

As an alternative method for assembling the pump equipment 100, it is possible to apply a divided assembly method. That is, after inserting the drive shaft 54 into the third cylinder 71c and the second cylindrical center plate 73b in which the outer and inner rotors 51 and 52 are contained, the third cylinder 71c and the second cylindrical center plate 73b are held in the holder 101 and, then, temporarily fixed by a screw 94 as described in the FIG. 3 after finishing the circumference position setting in a similar way as mentioned above.

Next, the second cylinder 71b, the first cylindrical center plate 73a and the first cylinder 71a are inserted in order into the drive shaft 54 to be held by the holder 101 and, then, temporarily fixed by a screw 95 after finishing the circumference position setting in a similar way as mentioned above.

After completing the temporary fixing, the outer surfaces of the pump equipment 100 are finally welded.

As the diameter of screws 94 and 95 is slender and their strength is not sufficient to finally assemble the pump equipment 100 so that the space necessary for the temporary fixing may be limited, there is no fear that the pump equipment 100 becomes large. It is possible to eliminate the screws 94 and 95, if final welding is made from the beginning without the temporary fixing.

What is claimed is:

1. A method for assembling a pump equipment having a drive shaft and first and second rotary pumps, wherein the first rotary pump is comprised of first rotors to be rotated by the drive shaft, a first cylindrical center plate, first and second cylinders and a first pump room constructed by putting the first cylindrical center plate between the first and second cylinders for containing the first rotors therein, and the second rotary pump is comprised of second rotors to be rotated by the drive shaft, a second cylindrical center plate, the second cylinder, a third cylinder and a second pump room constructed by putting the second cylindrical center plate between the second and third cylinders for containing the second rotors therein, and, further, wherein the first cylinder, the first cylindrical center plate, the second cylinder, the second cylindrical center plate and the third cylinder are stacked one on top of another and fixed together, comprising the steps of:

piling up the first cylinder, the first cylindrical center plate, the second cylinder, the second cylindrical center plate and the third cylinder, applying a laser beam, as a spot welding, to a part of the respective peripheral borders of the first cylinder, the first cylindrical center plate, the second cylinder, the second cylindrical center plate and the third cylinder; and welding all around the respective peripheral borders of the first cylinder, the first cylindrical center plate, the second cylinder, the second cylindrical center plate and the third cylinder.

2. A method according to claim 1, wherein an energy of the spot welding by the laser beam is less than that of the final welding.

3. A method according to claim 1, wherein the spot welding by the laser beam is conducted from plural places where the forces given to the spot welding portions by the respective laser beams are canceled out and counterbalanced with each other.

4. A method according to claim 1, wherein the outer circumferences of the first, second and third cylinders are provided with flange portions.

5. A method according to claim 1, further comprising the steps of: adjusting a clearance between the first rotors and the first pump room by pivoting the first cylindrical center plate at least on the first cylinder before spot welding; and adjusting a clearance between the second rotors and the second pump room by pivoting the second cylindrical center plate at least on the third cylinder before spot welding.

6. A method for assembling a pump equipment having a drive shaft and first and second rotary pumps, wherein the first rotary pump is comprised of first rotors to be rotated by the drive shaft, a first cylindrical center plate, first and second cylinders and a first pump room constructed by putting the first cylindrical center plate between the first and second cylinders for containing the first rotors therein, and the second rotary pump is comprised of second rotors to be rotated by the drive shaft, a second cylindrical center plate, the second cylinder, a third cylinder and a second pump room constructed by putting the second cylindrical center plate between the second and third cylinders for containing the second rotors therein, and, further, wherein the first cylinder, the first cylindrical center plate, the second cylinder, the second cylindrical center plate and the third cylinder are stacked one on top of another and fixed together, comprising the steps of:

piling up the first cylinder, the first cylindrical center plate, the second cylinder, the second cylindrical center plate and the third cylinder; and simultaneously applying a laser beam from plural positions symmetrical with each other and with respect to the center axis of the pump equipment to the first cylinder, the first cylindrical center plate, the second cylinder, the second cylindrical center plate and the third cylinder.

7. A method for assembling a pump equipment having a drive shaft and first and second rotary pumps, wherein the first rotary pump is comprised of first rotors to be rotated by the drive shaft, a first cylindrical center plate, first and second cylinders and a first pump room constructed by putting the first cylindrical center plate between the first and second cylinders for containing the first rotors therein, and the second rotary pump is comprised of second rotors to be rotated by the drive shaft, a second cylindrical center plate, the second cylinder, a third cylinder and a second pump room constructed by putting the second cylindrical center plate between the second and third cylinders for containing the second rotors therein, and, further, wherein the first cylinder, the first cylindrical center plate, the second cylinder, the second cylindrical center plate and the third cylinder are stacked one on top of another and fixed together, comprising the steps of:

piling up the third cylinder and the second cylindrical center plate;

making a first subassembly by temporarily fastening with a first screw the third cylinder and the second cylindrical center plate;

piling up the second cylinder, first cylindrical center plate and the first cylinder;

making a second subassembly by temporarily fastening with a second screw the second cylinder, first cylindrical center plate and the first cylinder;

piling the first and second subassemblies; and welding all around the respective peripheral borders of the first cylinder, the first cylindrical center plate, the second cylinder, the second cylindrical center plate and the third cylinder.

* * * * *